(12) United States Patent
Kewitsch

(10) Patent No.: US 12,462,122 B2
(45) Date of Patent: Nov. 4, 2025

(54) AUTOMATED PHYSICAL NETWORK MANAGEMENT SYSTEM UTILIZING HIGH-RESOLUTION RFID, OPTICAL SCANS, AND MOBILE ROBOTIC ACTUATOR

(71) Applicant: Telescent Inc., Irvine, CA (US)

(72) Inventor: Anthony Stephen Kewitsch, Santa Monica, CA (US)

(73) Assignee: Telescent Inc., Irvine, CA (US)

( * ) Notice: Subject to any disclaimer, the term of this patent is extended or adjusted under 35 U.S.C. 154(b) by 108 days.

(21) Appl. No.: 18/129,230

(22) Filed: Mar. 31, 2023

(65) Prior Publication Data

US 2023/0316014 A1    Oct. 5, 2023

Related U.S. Application Data

(63) Continuation-in-part of application No. 17/227,883, filed on Apr. 12, 2021, now Pat. No. 11,650,598, which is a continuation-in-part of application No. 16/504,166, filed on Jul. 5, 2019, now Pat. No. 10,977,458, which is a continuation of application No. PCT/US2017/069148, filed on Dec. 30, 2017.

(51) Int. Cl.
G06K 7/10    (2006.01)
(52) U.S. Cl.
CPC ..... *G06K 7/10366* (2013.01); *G06K 7/10356* (2013.01)
(58) Field of Classification Search
CPC .. G06K 7/10; G06K 17/00; B25J 5/00; H04L 12/12
See application file for complete search history.

(56) References Cited

U.S. PATENT DOCUMENTS 7,289,197 B2    10/2007    Kewitsch
7,315,681 B2    1/2008    Kewitsch
(Continued)

FOREIGN PATENT DOCUMENTS

WO    2016151505 A1    9/2016
WO    2018183045 A1    10/2018
(Continued)

OTHER PUBLICATIONS

EPO, Extended European Search Report for European Application No. EP17936601, mailed Oct. 20, 2021, 10 pages.
(Continued)

*Primary Examiner* — Thien M Le
(74) *Attorney, Agent, or Firm* — Siritzky Law, PLLC

(57) ABSTRACT

A mobile robot system for automated operation of a data center or telecommunications office, includes a moveable robotic platform with a multiplicity of tools integrated therein to operate on a network element within a bay, with integrated RFID (radio-frequency identification) tags and visual alignment markers attached to fiber optic connectors and ports of the network elements. The mobile robot system positions a robot probe arm with an RFID probe for proximity detection to identify a cable and associated fiber optic connector based on a unique RF identifier of a tag on the fiber optic connector. The robot probe arm has a connector gripper to engage and unplug the associated fiber optic connector.

22 Claims, 16 Drawing Sheets

(56) References Cited

U.S. PATENT DOCUMENTS

| | | | |
|---|---|---|---|
| 7,432,817 B2 | 10/2008 | Phipps et al. | |
| 7,460,753 B2 | 12/2008 | Kewitsch | |
| 7,642,916 B2 | 1/2010 | Phipps et al. | |
| 7,665,901 B2 | 2/2010 | Kewitsch | |
| 7,806,333 B1* | 10/2010 | McReynolds | G06K 7/10316 235/492 |
| 7,885,795 B2 | 2/2011 | Rasmussen et al. | |
| 7,920,764 B2 | 4/2011 | Kewitsch | |
| 8,010,999 B2 | 8/2011 | Fujita et al. | |
| 8,068,715 B2 | 11/2011 | Kewitsch | |
| 8,111,163 B2 | 2/2012 | Utaka et al. | |
| 8,150,227 B2 | 4/2012 | Kewitsch | |
| 8,258,953 B2 | 9/2012 | Stern et al. | |
| 8,428,405 B2 | 4/2013 | Kewitsch | |
| 8,463,091 B2 | 6/2013 | Kewitsch | |
| 8,480,310 B2 | 7/2013 | Kewitsch | |
| 8,488,938 B2 | 7/2013 | Kewitsch et al. | |
| 8,554,033 B2 | 10/2013 | Kewitsch | |
| 8,805,155 B2 | 8/2014 | Kewitsch | |
| 9,052,465 B2 | 6/2015 | Kewitsch | |
| 9,052,490 B2 | 6/2015 | Kewitsch | |
| 9,110,249 B2 | 8/2015 | Kewitsch | |
| 9,188,748 B2 | 11/2015 | Kewitsch | |
| 9,411,108 B2 | 8/2016 | Kewitsch | |
| 9,703,060 B2 | 7/2017 | Kewitsch | |
| 9,908,239 B1 | 3/2018 | O'Brien et al. | |
| 10,042,122 B2 | 8/2018 | Kewitsch | |
| 10,345,526 B2 | 7/2019 | Kewitsch et al. | |
| 10,649,149 B2 | 5/2020 | Kewitsch | |
| 10,895,691 B2 | 1/2021 | Kewitsch | |
| 10,977,458 B2 | 4/2021 | Kewitsch | |
| 2005/0246248 A1 | 11/2005 | Vesuna | |
| 2008/0159738 A1* | 7/2008 | Lavranchuk | G02B 6/3895 398/17 |
| 2008/0240724 A1 | 10/2008 | Aguren et al. | |
| 2010/0098425 A1 | 4/2010 | Kewitsch | |
| 2010/0201488 A1 | 8/2010 | Stern et al. | |
| 2010/0316171 A1* | 12/2010 | Ino | H04L 7/042 708/422 |
| 2010/0316334 A1 | 12/2010 | Kewitsch | |
| 2011/0273270 A1* | 11/2011 | Brumer | A61B 5/282 340/10.1 |
| 2013/0120197 A1* | 5/2013 | Lin | H01Q 9/045 343/700 MS |
| 2016/0109662 A1* | 4/2016 | Anne | H04Q 1/148 385/75 |
| 2016/0183653 A1* | 6/2016 | Warther | G06K 19/07726 340/10.51 |
| 2017/0001080 A1* | 1/2017 | Komatsu | A63B 37/007 |
| 2017/0313421 A1 | 11/2017 | Gil | |
| 2018/0024306 A1 | 1/2018 | Adiletta et al. | |
| 2018/0124094 A1* | 5/2018 | Hamdi | G06F 7/24 |
| 2018/0215041 A1 | 8/2018 | Morrill et al. | |
| 2019/0161190 A1 | 5/2019 | Gil et al. | |
| 2019/0293875 A1 | 9/2019 | Kewitsch | |
| 2020/0003978 A1 | 1/2020 | Kewitsch | |
| 2020/0005001 A1 | 1/2020 | Kewitsch | |
| 2020/0041725 A1 | 2/2020 | Kewitsch | |
| 2020/0358277 A1 | 11/2020 | Kewitsch | |
| 2020/0359117 A1 | 11/2020 | Kewitsch | |
| 2021/0072483 A1 | 3/2021 | Kewitsch et al. | |
| 2021/0101233 A1 | 4/2021 | Kewitsch | |
| 2021/0232154 A1 | 7/2021 | Kewitsch | |
| 2021/0239910 A1 | 8/2021 | Kewitsch | |
| 2022/0197306 A1* | 6/2022 | Cella | G06N 20/10 |

FOREIGN PATENT DOCUMENTS

| | | |
|---|---|---|
| WO | 2021021280 A1 | 2/2021 |
| WO | 2021046227 A1 | 3/2021 |
| WO | 2021158492 A1 | 8/2021 |

OTHER PUBLICATIONS

WIPO, International Search Report received in International Application No. PCT/US2017/069148, May 2, 2018, (4p.).

WIPO, International Preliminary Report on Patentability received in International Application No. PCT/US2017/069148, Jun. 30, 2020, (6p.).

WIPO, International Written Opinion received in International Application No. PCT/US2017/069148, May 2, 2018, (5p.).

WIPO, International Search Report received in International Application No. PCT/US2021/02866, Dec. 10, 2021, (8p.).

WIPO, International Written Opinion received in International Application No. PCT/US2021/02866, Dec. 10, 2021, (5p.).

WIPO, International Preliminary Report on Patentability received in International Application No. PCT/US2021/02866, Oct. 12, 2023, (6p.).

EPO, Extended European Search Report received in European Application No. 21937126.7, Nov. 25, 2024, (9p.).

* cited by examiner

Training/Learning Process

AUTOMATED PHYSICAL NETWORK MANAGEMENT SYSTEM UTILIZING HIGH-RESOLUTION RFID, OPTICAL SCANS, AND MOBILE ROBOTIC ACTUATOR

RELATED APPLICATIONS

This application is a continuation-in-part (CIP) of U.S. application Ser. No. 17/227,883, filed Apr. 12, 2021, which is a continuation-in-part (CIP) of U.S. application Ser. No. 16/504,166 filed Jul. 5, 2019, U.S. Pat. No. 10,977,458, issued Apr. 13, 2021, which is a continuation of PCT/US2017/069148 filed Dec. 30, 2017, the entire contents of each of which are hereby fully incorporated herein by reference for all purposes.

FIELD OF THE INVENTION

This invention relates to methods and apparatus for managing and automating the physical connectivity of optical fiber networks, in particular, automated systems to inventory, locate, discover, and test a network with a large number of physical communication links comprised of optical and electronic network elements joined by network cables.

BACKGROUND

High bandwidth fiber optic communication networks comprise of multiple interconnected physical network links, each link including a length of optical fiber cable, a multiplicity of network elements with optical network interfaces, and potentially a multiplicity of network elements with electronic network interfaces. Typical optical interfaces utilize fiber optic cables with LC or MPO connectors and support 10 Gbps to 100 Gbps+ data rates, and typical electronic interfaces utilize copper cabling and 1 Gbps to 10 Gbps data rates. Large-scale data center networks are enormously complex and are comprised of 100 thousand to 1 million links, generally arranged in a hierarchical tree, interconnected mesh, ring, or a hub and spoke type arrangement.

The mapping of this large number of links within the physical layer, regardless of the details of the specific network architecture, is in many ways analogous to mapping today's highways and streets. However, the dynamic nature of the communication links, the lack of adequate link locating tools, and their heterogeneity (fiber type, bandwidth, data rate, wavelength, modulation format, etc.) add layers of complexity. New tools to manage this are in particular need.

Improved means to effectively document, map and re-route physical interconnections within the network are required. Existing RFID (radio frequency identification) technology can be used to identify network elements and network cables. However, while RFID systems enable assets to be identified, automated discovery of the interrelations between network elements and cables (e.g., how they are interconnected to create the network topology) and their precise physical locations are outside the capability of current technologies.

Automated systems for data center and telecommunications service providers to discover and track the physical connectivity relationships between network links are in great demand. Such systems enable new modes of operation supporting applications such as same-day provisioning and one-touch deployment of high bandwidth fiber services, in addition to the obvious benefits of eliminating network downtime due to human errors and physical database inconsistencies with the actual network. Moreover, if physical networks are able to implement two key breakthroughs: accurate fiber interconnection database and software-defined, reconfigurable cross-connections, there is the added benefit of operational expense savings by reducing the need to deploy service vehicles (i.e., truck rolls).

Extensions to current RFID technology are needed to enable an accurate fiber interconnection database. Standard Low Frequency (LF) passive RFID tags operate at frequencies of 125 kHz and 134.3 kHz and provide a read distance of 10 cm. RFID integrated circuit chips have been developed (e.g., NXP Semiconductor) for low-frequency (LF) passive RFID transponders compliant with the ISO 11784 and 11785 standards, including an anti-collision algorithm that can be used to read more than one tag in the same reader's field. Alternative approaches include High Frequency (HF) passive RFID tags that operate at 13.56 MHz and have a maximum read distance of typically one to a few meters. However, these approaches do not provide accurate determination of position or the physical relationships between interconnections (e.g., what cable is plugged into what port).

A technology to improve the spatial resolution in which the three-dimensional location of miniature RFID tags (<5 mm per side) can be measured with high accuracy (to within <5 mm) is of great importance to extend the application of RFID tags to network connectivity discovery. Today's state-of-the-art RFID tag scanning technologies use active ultra-wideband (UWB) RFID systems and are able to discriminate the location of a tagged object in three dimensions to within a few tens of cm. For example, a system that pinpoints a tag's location to within 10 cm has been described [RFID Journal, Jun. 30, 2014, "DecaWave Intros Ultra-wideband Active RFID Module"]. However, these active UWB tags are costly (>$10), require power (i.e., a battery), and are large (~3×3×3 cm), making them ill-suited for deployment in high-density fiber optic network port identification applications. An alternative approach uses a phased-array antenna system to locate passive tags in three-dimensional space to within about 1 meter [RFID Journal, Apr. 14, 2008, "Mojix Takes Passive UHF RFID to a New Level"]; however, this spatial resolution is three orders of magnitude less than required.

Other approaches to locate electronic devices in three dimensions, although not necessarily tags, utilize the GPS satellite-based positioning system. However, this does not perform well indoors, especially in the highly shielded environments of data centers, nor does it attain mm spatial resolution. For indoor environments, positioning systems that rely on existing wireless RF network infrastructures, such as Wi-Fi positioning systems or Bluetooth, are able to provide location accuracies ranging from 1 to 10 m ["The Study on Using Passive RFID Tags for Indoor Positioning," S. L. Ting et al., International Journal of Engineering Business Management, Vol. 3, No. 1 (2011)].

Therefore, until now, the inability to accurately locate RFID tags to within a few mm in three-dimensional space and the inability to miniaturize RFID tags to a few mm in size prevent RFID technology from being widely deployed in data centers and telecommunications facilities. Thus, there remains a significant need to track the connectivity of all network cables within a facility, and these cables are currently invisible to network management systems.

SUMMARY

The present invention is specified in the claims as well as in the below description.

These features, along with additional details of the invention, are described further in the examples herein, which are intended further to illustrate the invention but are not intended to limit its scope in any way.

In some aspects, the present invention is comprised of a highly scalable network cable configuration-tracking system, utilizing a network of unique, miniature RFID tags that can be read out with a spatial resolution of less than 5 mm. The data generated by these RFID scans is augmented by three-dimensional optical scans, then merged and processed to construct an accurate and complete representation of the physical state of the network. In a preferred embodiment, inexpensive, networked RFID readers with multiplexed antenna arrays are integrated with or added externally to fiber optic patch panels and networking apparatus. Miniature, high-resolution RFID tags, typically less than about 50 $mm^3$ in size, are attached to the ports, transceivers, and line cards of network elements, and are read back through an antenna array with high spatial discrimination. In an alternative embodiment, RFID scanning uses a compact RFID probe operating in proximity mode, which is attached to the end of a remotely actuable robotic arm, with the arm being able to be transported to precise locations throughout the data center on a guided motorized platform.

A controller processes RF and optical scans to determine tag location and correspondence to a physical asset. This configuration data is saved within a database of physical configuration records. The precise physical location of each asset, as well as its location and connectivity relationships within the physical network topology, is automatically discovered.

A single large data center is typically comprised of hundreds of thousands of network cables connecting tens of thousands of network elements. Moreover, fiber optic connectors, transceivers, pluggable optics, and related devices continue to undergo significant advances leading to increased bandwidth, density, and reduced size. This places unique demands when applying RFID labeling and interrogation techniques to these miniature devices, compared to traditional warehouse inventory tracking of large packages, etc. Furthermore, it is necessary to know the precise location of all tags to ascertain where the network cables are attached at both ends.

Compact RFID tags that can be located with high spatial resolution in three dimensions, and the system to automatically locate and read them within data centers, are thus critically important to support the continued scaling of data centers. Moreover, autonomous systems incorporating and processing this tag information are increasingly important to engineer, maintain, optimize, and monitor the physical network link topology.

In some aspects, the present invention includes a mobile robot system comprised of a moveable robotic platform with a multiplicity of tools therein to assist in the automated operations of a data center or telecommunications office. The system uses RFID tags (and potentially alignment markers for use by a vision system) attached to fiber optic connector ports on network elements such as routers, switches, patch panels, and cross-connects. These tags and markers may be used to precisely guide the mobile robot's extendable arm, which is equipped with various tools to enable manual installation and maintenance functions to be automated. The location of these tags and markers is fixed and referenceable within the equipment bays of the data center or office.

In some particular embodiments, the mobile robot is comprised of a moveable, wheeled robot transport platform that is able to navigate throughout the office or data center with a payload comprised of the various tools whose operation depends on the precise registration of the connector gripper relative to the connector ports of the network elements as well as a software system to control its operation. This moveable platform is able to position the tools with precise registration relative to the positions of pre-discovered and mapped connector ports. For example, the mobile robot's extendable arm with an RFID probe antenna attached thereto is able to identify cables and locate their associated connectors with millimeter accuracy based on proximity readout of RFID tags and sub-millimeter accuracy with machine vision alignment enabled by an integrated camera system.

As a result of this ability to identify and precisely locate connectors on network elements, several novel functions are realized. For example, the mobile robot is able to clean connectors using, for example, a dry fabric cleaner which is swiped across the connector ferrule(s) endface(s). In a further example, the mobile robot is able to inspect the endface of connectors using a high-resolution optical microscope and contamination classification system. In a further example, the mobile robot is able to test cables and optical links using, for example, an OTDR, Optical Loss Meter, or Packet Analyzer. In a further example, the mobile robot is able to swap transmit and receive connectors on a duplex cable link for improperly installed cables. In a further example, the mobile robot is able to reconfigure cable connections among a subset of ports within a limited region. In a further example, the mobile robot is able to identify and disconnect unused cable and potentially remove or mark the corresponding unused connector to avoid potential inventory and cable clutter issues.

Moreover, the mobile robot is able to apply an RFID tag or label to a cable. In addition, the mobile robot is able to extract, replace, and install fiber optic cables and pluggable optics such as SFR, QSFT, CFP, XENPAK, XPAK, X2, XFP, etc., into corresponding ports in network elements.

In a further example, the mobile robot is able to fusion splice a cable and/or connector. As a result of this capability, the mobile robot is able to replace a damaged connector on a cable by fusion splicing a field-installable connector onto the cable to automate the repair and service restoration processes.

One general aspect includes a mobile robot system for automated operation of a data center or telecommunications office. The mobile robot system also includes the mobile robot system is constructed and adapted to position a robot probe arm with an RFID probe for proximity detection to identify a cable and associated fiber optic connector based on a unique RF identifier of a tag on the fiber optic connector and where. The system also includes the robot probe arm further includes a connector gripper that is constructed and adapted to engage and unplug the associated fiber optic connector.

Embodiments and/or implementations may include one or more of the following features, alone and/or in combination (s):

The mobile robot system where the mobile robot system is constructed and adapted to clean fiber optic connectors. The mobile robot system cleans a fiber optic connector with a dry fabric cleaner that is swiped across a ferrule endface of the fiber optic connector. The mobile robot system is constructed and adapted to inspect the endfaces of fiber optic connectors using a high-resolution optical microscope and/ or a contamination classification system. The mobile robot system is constructed and adapted to test cables and optical links using one or more of an optical time-domain reflectometer (OTDR), an optical loss meter, and/or a packet analyzer. The mobile robot system is constructed and adapted to swap transmit and receive fiber optic connectors on a duplex cable link for improperly installed cables. The mobile robot system is constructed and adapted to reconfigure cable connections among a subset of ports within the bay. The mobile robot system is constructed and adapted to identify and disconnect unused cables. The mobile robot system is constructed and adapted to cut-off one or more unused fiber optic connectors corresponding to the unused cables. The mobile robot system is constructed and adapted to attach an RFID tag or label to a cable. The mobile robot system is constructed and adapted to extract, replace, and/or install fiber optic cables and pluggable optics in network elements. The mobile robot system is constructed and adapted to fusion splice a cable and/or fiber optic connector. The mobile robot system is constructed and adapted to replace a damaged fiber optic connector on a cable by fusion splicing a splice-on fiber optic connector.

Another general aspect includes a mobile robot system to perform automated installation and maintenance tasks in a data center or telecommunications office having multiple bays with networked equipment. The system may include a moveable robotic platform with one or more robot arms to position one or more robotic hands, including actuable fingers to locations across a front face of the networked equipment within the bay, the positioning of the one or more robotic hands may be determined based on spatially localized readout of integrated RFID (radio-frequency identification) tags attached to fiber optic connectors and/or ports of the networked equipment, where the positioning is augmented by visual alignment markers to position the one or more robotic hands relative to the fiber optic connectors and ports.

Embodiments and/or implementations may include one or more of the following features, alone and/or in combination(s):

The system where a machine vision system is used to precisely position the one or more robotic hands relative to the fiber optic connectors and ports. The system where the one or more robotic hands are instructed by a controller system that has been previously trained to perform one or more sequences of movements. The system where the controller system was previously trained by an operator with one or more sensor gloves that record one or more sequences of movements to complete a task, enabling the controller to subsequently perform the task using the one or more robotic hands. The system additionally includes a fiber optic connector cleaner and fiber optic connector inspection microscope. The system with the robotic hands being sized to enable the actuable fingers to grasp, unplug, and plug in fiber optic connectors. The system where one or more fingers of the one or more robotic hands are able to access, press, and/or actuate manual switches. The system where manual switches include power switches and/or reset switches.

Another general aspect includes a method of operation of a data center or telecommunications office. The method of operation also includes the mobile robot system positioning a robot probe arm with an RFID probe for proximity detection to identify a cable and associated fiber optic connector based on a unique RF identifier of a tag on the fiber optic connector. The operation also includes a connector gripper of the robot probe arm engaging and unplugging the associated fiber optic connector.

Embodiments may include one or more of the following features, alone and/or in combination(s):

The method may include the mobile robot system performing one or more of: (i) inspecting endfaces of fiber optic connectors using a high-resolution optical microscope and/or a contamination classification system; and/or (ii) testing cables and optical links using one or more of: an optical time domain reflectometer (OTDR), an optical loss meter, and/or a packet analyzer; (iii) swapping transmit and receive fiber optic connectors on a duplex cable link for improperly installed cables; and/or (iv) reconfiguring cable connections among a subset of ports within the bay; and/or (v) identifying and disconnecting unused cables; and/or (vi) cutting off one or more unused fiber optic connectors corresponding to unused cables; and/or (vii) attaching an RFID tag or label to a cable; and/or (viii) extracting, replacing, and/or installing fiber optic cables and pluggable optics in network elements; and/or (ix) fusion splicing a cable and/or fiber optic connector; and/or (x) replacing a damaged connector on a cable by fusion splicing a splice-on fiber optic connector; and/or (xi) cleaning a fiber optic connector. Cleaning a fiber optic connector may include swiping a dry fabric cleaner across a ferrule endface of the fiber optic connector.

One general aspect includes an RFID (radio-frequency identification) tracking system for data center assets for automatically discovering and tracking a configuration of a multiplicity of cables terminated in connectors and connected to one of a multiplicity of numbered connector receptacles. The RFID (radio-frequency identification also includes one or more equipment racks, including networked devices therein with multiple spaced apart connector receptacles therein, each equipment rack having an RFID tracking module operating at a given frequency with an upstream network management interface and a downstream array of short-range RFID readout antenna elements, each antenna element being individually addressable by a multiplexing circuit. The identification also includes a multiplicity of fiber optic cables, each having a pair of terminating connectors, each cable including an RFID tag with a corresponding tag identifier and with less than 5 mm readout range attached in the vicinity of each said terminating connector. The identification also includes the array of RFID readout antenna elements attached to equipment or patch panels, such that each short-range antenna element is located in the vicinity of a corresponding numbered connector receptacle and able to read out an RFID tag identifier of any of the multiplicity of cables connected to the corresponding numbered connector receptacle. The identification also includes a remote management server for storing data of the RFID tag identifier associated with each of the multiplicity of cables, the identifiers associating each RFID antenna element with a particular numbered connector receptacle.

Embodiments and/or implementations may include one or more of the following features, alone and/or in combination(s):

The system where said fiber optic cables are typically 1 to 1000 meters long and said terminated connectors may include LC, SC, FC, CS, SN, MDC, MT, and/or MTP/MPO connectors.

The RFID readout antenna elements are each substantially similar in size and less than about 100 mm in length and width.

The given frequency is about 125 kHz.

The RFID tags are energized passively by a close-coupled rf excitation signal and may include an integrated circuit and an inductor and capacitor forming a resonant circuit.

The resonant circuit is tuned to be selectively responsive to the given frequency.

The volume of the RFID tag is less than 200 mm³.

The RFID tag is housed within a plastic injection molded clip element that positions the RFID tag in alignment with the particular antenna element and with a separation of no more than 4 mm.

The RFID readout antenna elements are in a planar configuration on a flexible plastic substrate.

The flexible plastic substrate includes a pressure-sensitive adhesive backing layer to affix the antenna to a surface of the networked device in the vicinity of the connector receptacle.

The upstream network management interface utilizes an ethernet interface.

The peak voltage at the given frequency on the short-range antenna element is greater than 10 volts.

The tag identifier may include an 8-bit or larger digital identifier.

The RFID tag is passive and does not require a battery.

The networked devices include one or more of the following: manual patch panels, programmable patch panels, optical circuit switches, optical test equipment, packet monitoring devices, packet switches, packet routers, servers, storage devices, and fiber optic transport systems.

The short-range antenna element may include a parallel arrangement of an unshielded inductor and a capacitor.

The unshielded inductor and the capacitor are on a printed circuit substrate.

The inductor has an inductance of at least 1 millinery.

The RFID tags are less than 5 mm per side.

The RFID tag associated with each is attached within no more than 4 mm of each corresponding terminating connector.

Each short-range antenna element is located no more than 4 mm from a corresponding numbered connector receptacle.

Another general aspect includes an RFID (radio-frequency identification) tracking system for data center assets for automatically discovering and tracking a configuration of a multiplicity of cables terminated in connectors and connected to one of a multiplicity of numbered connector receptacles. The RFID (radio-frequency identification also includes one or more equipment racks, including networked devices therein with multiple spaced apart connector receptacles therein, each equipment rack having an RFID tracking module operating at a given frequency with an upstream network management interface and a downstream array of short-range RFID readout antenna elements, each antenna element being individually addressable by a multiplexing circuit. The identification also includes a multiplicity of fiber optic cables, each having a pair of terminating connectors, each cable including an RFID tag with a corresponding tag identifier and with less than 5 mm readout range attached within 4 mm of each said terminating connector. The identification also includes the array of RFID readout antenna elements attached to equipment or patch panels, such that each short-range antenna element is located within 4 mm of a corresponding numbered connector receptacle and able to read out an RFID tag identifier of any of the multiplicity of cables connected to the corresponding numbered connector receptacle. The identification also includes a remote management server for storing data of the RFID tag identifier associated with each of the multiplicity of cables, the identifiers associating each RFID antenna element with a particular numbered connector receptacle.

Below is a list of system embodiments. Those will be indicated with the letters "ST." Whenever such embodiments are referred to, this will be done by referring to "ST" embodiments or "ST system" embodiments.

ST1. An RFID (radio-frequency identification) tracking system for data center assets for automatically discovering and tracking a configuration of a multiplicity of cables terminated in connectors and connected to one of a multiplicity of numbered connector receptacles, the system comprising:
one or more equipment racks, including networked devices therein with multiple spaced apart connector receptacles therein, each equipment rack having an RFID tracking module operating at a given frequency with an upstream network management interface and a downstream array of short-range RFID readout antenna elements, each antenna element being individually addressable by a multiplexing circuit;
a multiplicity of fiber optic cables, each having a pair of terminating connectors, each cable including an RFID tag with a corresponding tag identifier and with less than 5 mm readout range attached in the vicinity of each said terminating connector;
the array of RFID readout antenna elements attached to equipment or patch panels, such that each short-range antenna element is located in the vicinity of a corresponding numbered connector receptacle and able to read out an RFID tag identifier of any of the multiplicity of cables connected to the corresponding numbered connector receptacle; and
a remote management server for storing data of the RFID tag identifier associated with each of the multiplicity of cables, the identifiers associating each RFID antenna element with a particular numbered connector receptacle.

ST2. The system of any of the system embodiments, wherein the fiber optic cables are 1 to 1000 meters in length, and the terminated connectors comprise LC, SC, FC, CS, SN, MDC, MT, and/or MTP/MPO connectors.

ST3. The system of any of the ST system embodiments, wherein the RFID readout antenna elements are each substantially similar in size and less than about 100 mm in length and width.

ST4. The system of any of the ST system embodiments, wherein the given frequency is about 125 kHz.

ST5. The system of any of the ST system embodiments, wherein the RFID tags are energized passively by a close-coupled RF excitation signal and comprise an integrated circuit and an inductor and capacitor forming a resonant circuit.

ST6. The system of claim 5, wherein the resonant circuit is tuned to be selectively responsive to the given frequency.

ST7. The system of any of the ST system embodiments, wherein the RFID readout antenna elements are in a planar configuration on a flexible plastic substrate.

ST8. The system of claim 7, wherein the flexible plastic substrate includes a pressure-sensitive adhesive backing layer to affix the antenna to a surface of the networked device in the vicinity of the connector receptacle.

ST9. The system of any of the ST system embodiments, wherein the upstream network management interface utilizes an Ethernet interface.

ST10. The system of claim 5, wherein the volume of the RFID tag is less than 200 mm³.

ST11. The system of any of the ST system embodiments, wherein the RFID tag is housed within a plastic injection molded clip element that positions the RFID tag in alignment with the particular antenna element and with a separation of no more than 4 mm.

ST12. The system of any of the ST system embodiments, wherein the peak voltage at the given frequency on the short-range antenna element is greater than 10 volts.

ST13. The system of any of the ST system embodiments, wherein the tag identifier comprises an 8-bit or larger digital identifier.

ST14. The system of any of the ST system embodiments, wherein the RFID tag is passive and does not require a battery.

ST15. The system of any of the ST system embodiments, wherein the networked devices include one or more of manual patch-panels, and/or programmable patch-panels, and/or optical circuit switches, and/or optical test equipment, and/or packet monitoring devices, and/or packet switches, packet routers, and/or servers, and/or storage devices, and/or fiber optic transport systems.

ST16. The system of any of the ST system embodiments, wherein the short-range antenna element comprises a parallel arrangement of an unshielded inductor and a capacitor.

ST17. The system of ST system embodiment(s) ST16, wherein the unshielded inductor and the capacitor are on a printed circuit substrate.

ST18. The system of any of ST system embodiments ST16-ST17, wherein the inductor has an inductance of at least 1 millinery.

ST19. The system of any of the ST system embodiments wherein the RFID tags are less than 5 mm per side.

ST20. The system of any of the ST system embodiments, wherein the RFID tag associated with each is attached within no more than 4 mm of each corresponding terminating connector.

ST21. The system of any of the ST system embodiments, wherein each short-range antenna element is located no more than 4 mm from a corresponding numbered connector receptacle.

ST22. An RFID (radio-frequency identification) tracking system for data center assets for automatically discovering and tracking a configuration of a multiplicity of cables terminated in connectors and connected to one of a multiplicity of numbered connector receptacles, comprising:
- one or more equipment racks, including networked devices therein with multiple spaced apart connector receptacles therein, each equipment rack having an RFID tracking module operating at a given frequency with an upstream network management interface and a downstream array of short-range RFID readout antenna elements, each antenna element being individually addressable by a multiplexing circuit;
- a multiplicity of fiber optic cables, each having a pair of terminating connectors, each cable including an RFID tag with a corresponding tag identifier and with less than 5 mm readout range attached within 4 mm of each said terminating connector;
- the array of RFID readout antenna elements attached to equipment or patch panels, such that each short-range antenna element is located within 4 mm of a corresponding numbered connector receptacle and able to read out an RFID tag identifier of any of the multiplicity of cables connected to the corresponding numbered connector receptacle; and
- a remote management server for storing data of the RFID tag identifier associated with each of the multiplicity of cables, the identifiers associating each RFID antenna element with a particular numbered connector receptacle.

Below is a list of system embodiments. Those will be indicated with the letter "S." Whenever such embodiments are referred to, this will be done by referring to "S" embodiments.

S1. A mobile robot system for automated operation of a data center or telecommunications office, comprised of a moveable robotic platform with a multiplicity of tools integrated therein, to operate on a network element within a bay, with integrated RFID (radio-frequency identification) tags and visual alignment markers attached to fiber optic connectors and ports of the network elements, wherein:
the mobile robot system is constructed and adapted to position a robot probe arm with an RFID probe for proximity detection to identify a cable and associated fiber optic connector based on a unique RF identifier of a tag on the fiber optic connector, wherein the robot probe arm further includes a connector gripper is constructed and adapted to engage and unplug the associated fiber optic connector.

S2. The mobile robot system of any of the system embodiments, wherein the mobile robot system is constructed and adapted to clean fiber optic connectors.

S3. The mobile robot system of any of the system embodiments, wherein the mobile robot system cleans a fiber optic connector with a dry fabric cleaner that is swiped across a ferrule endface of the fiber optic connector.

S4. The mobile robot system of any of the system embodiments, wherein the mobile robot system is constructed and adapted to inspect endfaces of fiber optic connectors using a high-resolution optical microscope and/or a contamination classification system.

S5. The mobile robot system of any of the system embodiments, wherein the mobile robot system is constructed and adapted to test cables and optical links using one or more of an Optical Time Domain Reflectometer (OTDR), an optical Loss Meter, and/or a packet analyzer.

S6. The mobile robot system of any of the system embodiments, wherein the mobile robot system is constructed and adapted to swap transmit and receive fiber optic connectors on a duplex cable link for improperly installed cables.

S7. The mobile robot system of any of the system embodiments, wherein the mobile robot system is constructed and adapted to reconfigure cable connections among a subset of ports within the bay.

S8. The mobile robot system of any of the system embodiments, wherein the mobile robot system is constructed and adapted to identify and disconnect unused cables.

S9. The mobile robot system of any of the system embodiments, wherein the mobile robot system is constructed and adapted to cut-off one or more unused fiber optic connectors corresponding to the unused cables.

S10. The mobile robot system of any of the system embodiments, wherein the mobile robot system is constructed and adapted to attach an RFID tag or label to a cable.

S11. The mobile robot system of any of the system embodiments, wherein the mobile robot system is constructed and adapted to extract, replace, and/or install fiber optic cables and pluggable optics in network elements.

S12. The mobile robot system of any of the system embodiments, wherein the mobile robot system is constructed and adapted to fusion splice a cable and/or fiber optic connector.

S13. The mobile robot system of any of the system embodiments, wherein the mobile robot system is constructed and adapted to replace a damaged fiber optic connector on a cable by fusion splicing a splice-on fiber optic connector.

S14. A mobile robot system to perform automated installation and maintenance tasks in a data center or telecommunications office having multiple bays with networked equipment, comprised of a moveable robotic platform with one or more robot arms to position one or more robotic hands, including actuable fingers to locations across a front face of the networked equipment within the bay, the positioning of the one or more robotic hands determined based on spatially localized readout of integrated RFID (radio-frequency identification) tags attached to fiber optic connectors and ports of the networked equipment, wherein the positioning is augmented by visual alignment markers to position the one or more robotic hands relative to the fiber optic connectors and ports.

S15. The mobile robot system of any of the system embodiments, wherein a machine vision system is used to precisely position the one or more robotic hands relative to the fiber optic connectors and ports.

S16. The mobile robot system of any of the system embodiments, wherein the one or more robotic hands are instructed by a controller system that has been previously trained to perform one or more sequences of movements.

S17. The mobile robot system of any of the system embodiments, wherein the controller system was previously trained by an operator with one or more sensor gloves that record one or more sequences of movements to complete a task, enabling the controller to subsequently perform the task using the one or more robotic hands.

S18. The mobile robot system of any of the system embodiments additionally including a fiber optic connector cleaner and fiber optic connector inspection microscope.

S19. The mobile robot system of any of the system embodiments, the robotic hands being sized to enable the actuable fingers to grasp, unplug and plug in fiber optic connectors.

S20. The mobile robot system of any of the system embodiments, one or more fingers of the one or more robotic hands are able to access, press, and/or actuate manual switches.

S21. The mobile robot system of any of the system embodiments, wherein the manual switches include power switches and/or reset switches Below is a list of process or method embodiments. Those will be indicated with the letter "P." Whenever such embodiments are referred to, this will be done by referring to "P" embodiments.

P22. A method of operation of a data center or telecommunications office, having a mobile robot system including a moveable robotic platform with a multiplicity of tools integrated therein, to operate on a network element within a bay, with integrated RFID (radio-frequency identification) tags and visual alignment markers attached to fiber optic connectors and ports of the network elements, the method comprising: the mobile robot system positioning a robot probe arm with an RFID probe for proximity detection to identify a cable and associated fiber optic connector based on a unique RF identifier of a tag on the fiber optic connector; and a connector gripper of the robot probe arm engaging and unplugging the associated fiber optic connector.

P23. The method of any of the method embodiments, further comprising the mobile robot system performing one or more of:
  (i) inspecting endfaces of fiber optic connectors using a high-resolution optical microscope and/or a contamination classification system; and/or
  (ii) testing cables and optical links using one or more of an Optical Time Domain Reflectometer (OTDR), an optical Loss Meter, and/or a packet analyzer;
  (iii) swapping transmit and receive fiber optic connectors on a duplex cable link for improperly installed cables; and/or
  (iv) reconfiguring cable connections among a subset of ports within the bay; and/or
  (v) identifying and disconnecting unused cables; and/or
  (vi) cutting off one or more unused fiber optic connectors corresponding to unused cables; and/or
  (vii) attaching an RFID tag or label to a cable; and/or
  (viii) extracting, replacing, and/or installing fiber optic cables and pluggable optics in network elements; and/or
  (ix) fusion splicing a cable and/or fiber optic connector; and/or
  (x) replacing a damaged connector on a cable by fusion splicing a splice-on fiber optic connector; and/or
  (xi) cleaning a fiber optic connector.

P24. The method of any of the method embodiments, wherein cleaning a fiber optic connector comprises swiping a dry fabric cleaner across a ferrule endface of the fiber optic connector.

Below are other embodiments:

The system of any of the system embodiments, alone or in combination, performing the method of any of the method embodiments alone or in combination.

The method of any of the method embodiments, alone or in combination, performed on the system of any of the system embodiments alone or in combination.

The above features, along with additional details of the invention, are described further in the examples herein, which are intended further to illustrate the invention but are not intended to limit its scope in any way.

BRIEF DESCRIPTION OF THE DRAWINGS

Various other objects, features, and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
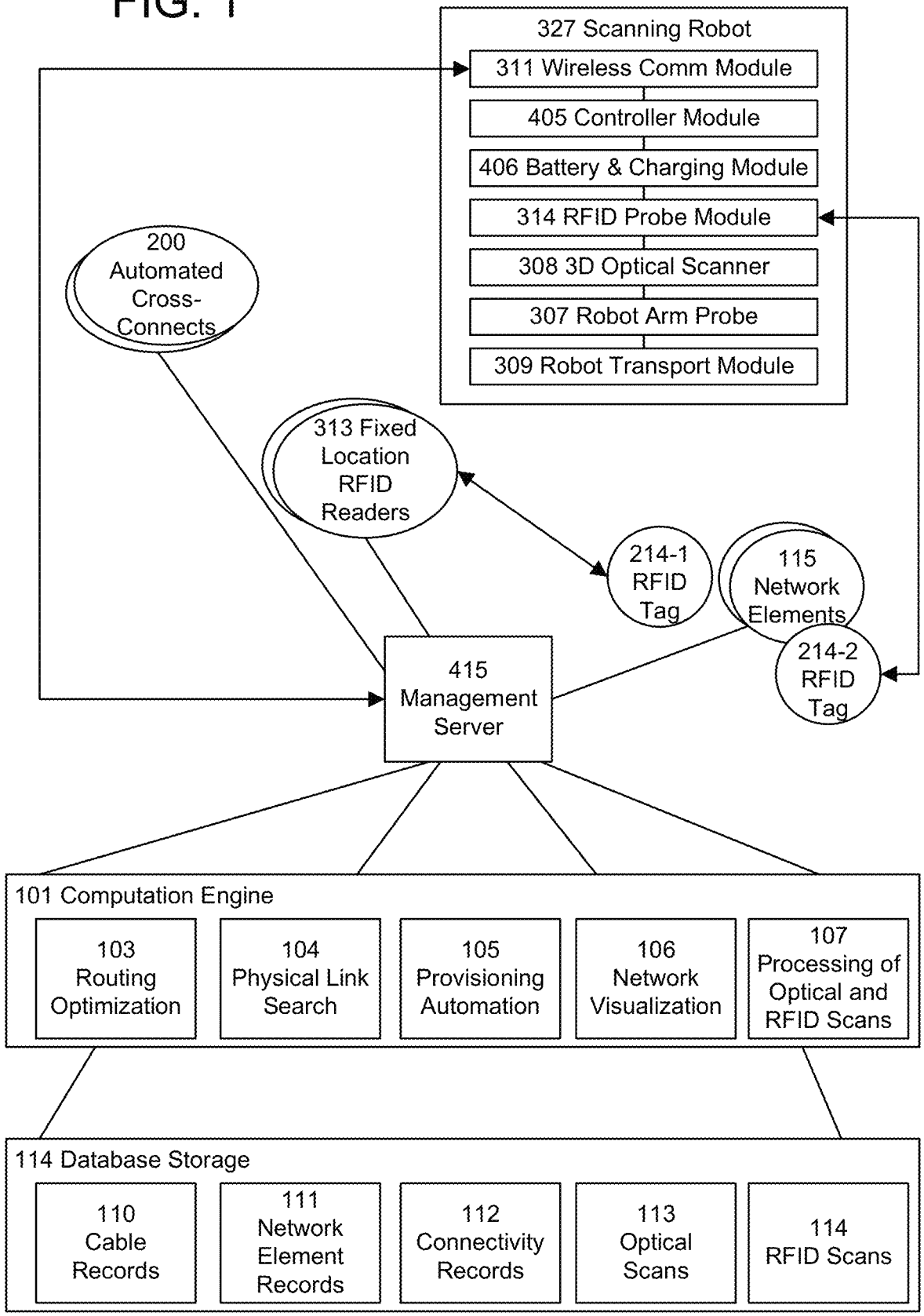
FIG. 1 is a block diagram of a robotic scanning system, as well as the subsystems providing the processing backend of an automated RFID physical link discovery, management and test system constructed in accordance with a preferred embodiment of the present invention.

The present invention comprises systems, apparatus, and methods for automatically discovering and tracking changes to the physical network topology of cables between all network devices in an optical fiber network. The system, a preferred embodiment of which is illustrated in block diagram form in FIG. 1, is controlled by one or more management servers 415 that communicate with one or more scanning robots 327, each robot having RFID and optical scanning capability. The system is used to monitor the connectivity state of a multiplicity of network elements 115 each with a multiplicity of RFID tags 214, and potentially one or more fixed location RFID readers 313 and automated cross-connects 200 (such as those described in Kewitsch et al., U.S. Pat. No. 8,068,715).

Each scanning robot 327 is comprised of a wireless communication module 311, embedded control module 405, battery and charging module 406, RFID probe module 314, robot probe arm 307, optical scanning module 308, and robot transport platform 309. Multiple software modules operate in coordination with the robotic scanning subsystem 327 and reside on the management server 415, including a computational engine 101 comprised of routing optimization 103, physical link search 104, provisioning automation 105, network visualization 106, processing of optical/RFID scans 107, as well as a database 114 comprised of cable records 110, network element records 111, connectivity records 112, optical scans 113, and RFID scans 119.

Figure 2:
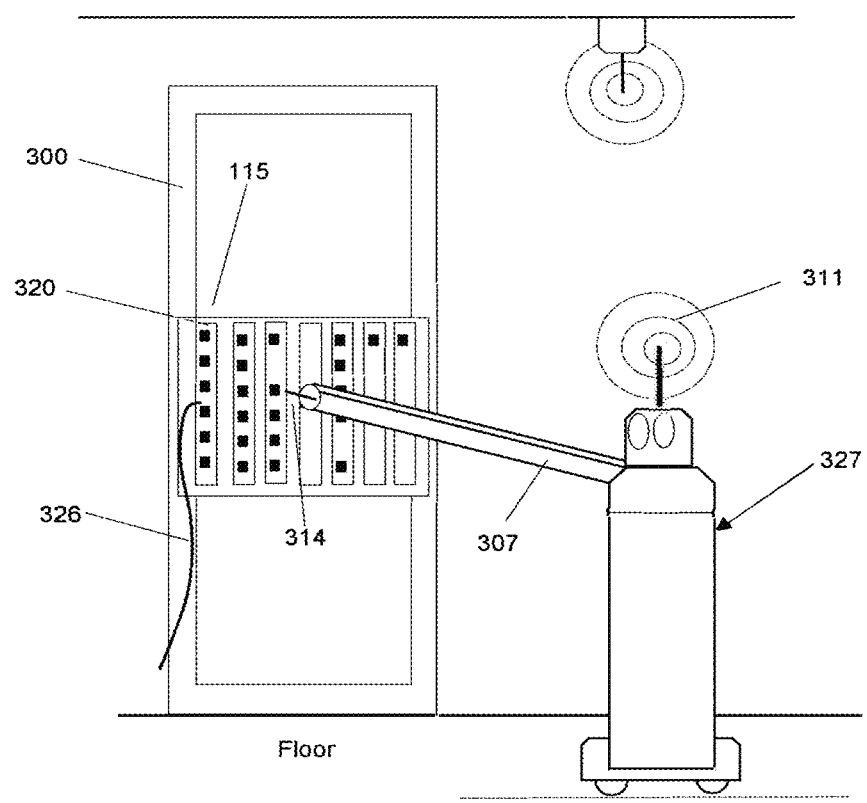
FIG. 2 illustrates a mobile RFID and optical scanning robotic system, wherein the robot is able to traverse each aisle of a data center, position itself adjacent a rack, and capture RFID scans of equipment racks.

FIG. 2 illustrates the scanning robot 327 in the process of interrogating an equipment rack 300 containing a multiplicity of network elements 115 with a further multiplicity of network ports 320. The RFID reader module 314 located at the end of the robot probe arm 307 is positioned in the vicinity of a selected RFID tag 214 based on stored position coordinates in network element database record 111. The RFID reader emits an RF signal 310 that energizes a local tag 214, enabling the tag to send back a return signal with its unique identifier, the identifier being phase or amplitude encoded in the return signal.

In case the equipment rack 300 includes a door with a latch (not shown here), the robot arm 307 includes a robot end effector capable of opening the door of the rack to gain access to the multiplicity of ports 320 and tags 214 therein. The scanning arm 307 includes encoder-sensing means, which in combination with precise locating capability of the robot platform, is used to determine the door latch and the tag location in three-dimensional space with relatively high accuracy (<1 mm). This level of accuracy is necessary to open the door properly and to position the scanning RFID probe 314 in close proximity to the tag 214.

Figure 3:
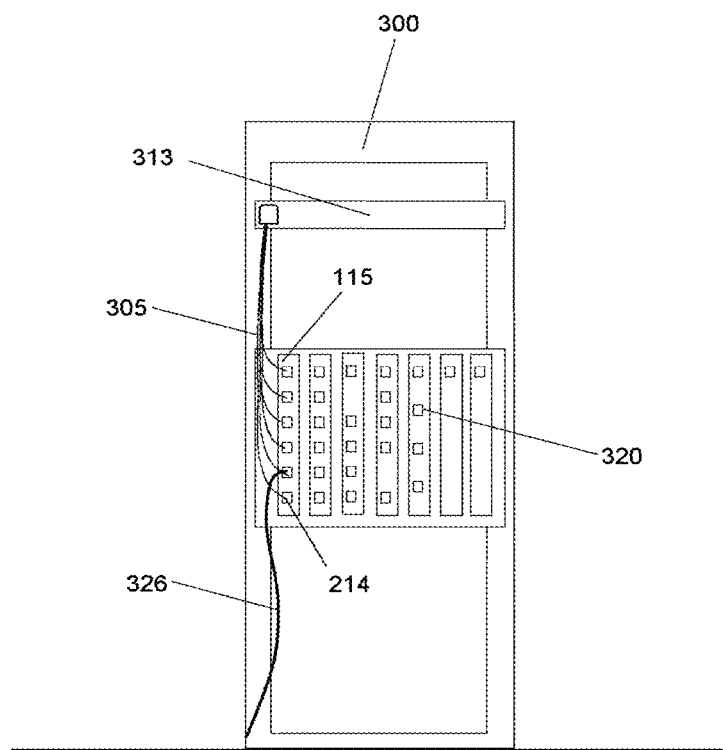
FIG. 3 illustrates an equipment rack with a multiplicity of network ports requiring RFID identification and tracking, which is equipped with a local RFID reader module and instrumented with a multiplicity of RFID reader antennae, each antenna adjacent a particular port.

Moreover, in accordance with the preferred embodiments of the present invention, low-frequency RFID readers and tags are utilized that require proximity readout with less than 3 to 4 mm distance between the tag antenna and the reader antenna. Such compact, passive, low-frequency RFID tags 214 can not only be read out by moveable RFID probe 314 but also by a distributed array of fixed, multiplexed, individually addressable reader antenna 321 in close proximity to the tags, as shown in FIG. 3. In this approach, each rack 300 includes an RFID reader unit 313, which interfaces to, for example, an RFID antenna harness comprised of a multiplicity of separate and individually addressable, miniature antenna elements 321 located on or in the vicinity of an interface surface 323 of a network element containing one or more network ports 320. The geometry of each interface surface 323 depends on the particulars of the network device. The surface geometry is stored in the database as a solid model associated with the corresponding network element record 111. The antenna element is sufficiently small that it is located at one or about a small number of numbered connector receptacle ports 320. The correspondence between numbered antenna elements and numbered ports is recorded at the time the antenna elements are installed. This configuration information is stored within the network element records database 111, and this correspondence will typically be fixed over the lifecycle of the network element. The RFID tag data, however, is dynamic and changes during the lifecycle of the network element because of updates to the network connectivity resulting from data center migration, load balancing, etc. The stored RFID scan data 119 is used to update the connectivity records database 112 so that the database accurately represents the current inventory of physical connections.

In a further example of this invention, a Low Frequency (LF) RFID reader module emits an RF tag excitation signal at the extended RFID probe 314. The probe comprises electrical components, including an inductor and capacitor, in parallel, launching the excitation signal with sufficient electromagnetic coupling efficiency to energize and activate any passive RFID tags 214 in close proximity. The selection of the inductor dictates the maximum readout range between tag and reader based upon the mutual inductance between tag and reader. In a particular example, the RFID reader transponder is configured for a resonance at 125 kHz by selecting an antenna/coil with L=1 mH and a parallel capacitor of 1.6 nF. Each RFID tag 214 includes its own antenna/coil with substantially similar inductance and capacitance. It is generally desirable that the inductors for both the reader and tag are large in terms of their inductance (~mH), utilize a ferrite core, and are unshielded to maximize the electromagnetic coupling efficiency/mutual inductance between tag and reader.

The tag assembly utilizes a substantially matched LC oscillator that is resonantly coupled to the reader excitation signal and produces a reflected RF signal, with the addition of an amplitude or phase modulation envelope on the 125 kHz carrier signal that carries the unique RFID identifier. The electromagnetic coupling for a system of two coils with a given mutual inductance is highly dependent on the separation, relative field orientation and inductance of the coils. Mutual inductance falls off rapidly with a distance between the reader antenna and tag inductor 212, and is significantly reduced once this separation exceeds the physical size of the inductors. At distances less than this size, electromagnetic signals at the 125 kHz resonance frequency are efficiently transferred from the reader to the tag, as well as from the tag to the reader.

In a further example of this invention, a multiplexed, multi-channel RFID reader 313 with a multiplexed antenna array 305 may be utilized instead of or in addition to the RFID probe subsystem of the mobile robot 327. Multiplexing of individual antenna elements 304 within the array 305 enables any one of a multiplicity of tags 214 on a multiplicity of cables 326 to be interrogated in rapid time succession by a reader 313 connected to network management server 415. This enables near real-time updates of the physical cabling connectivity for the particular equipment rack 300 served by the particular reader 313. The antenna array's individual antennas 304 are distributed to port locations 320 by running the individual antenna wire pairs and antenna along the interface panel 327 to the vicinity of each port 320 receiving a fiber optic cable 326 or to each physical asset that is tagged.

In a further example, the locations of tags 214 are measured and stored along with the three-dimensional model of the particular network device, the model suitably detailed to distinguish individual ports 320 therein. The antenna elements of the array can be integrated on a flexible substrate overlaid on the equipment front panel. The number of antenna elements 304 may total several hundred, for example, within a single equipment rack 300. When the reader selects a particular antenna for readout, the system thereby knows the location of the tag to within several mm, and based on this location, it can correlate the tag identifier with a particular port 320.

Figure 4:
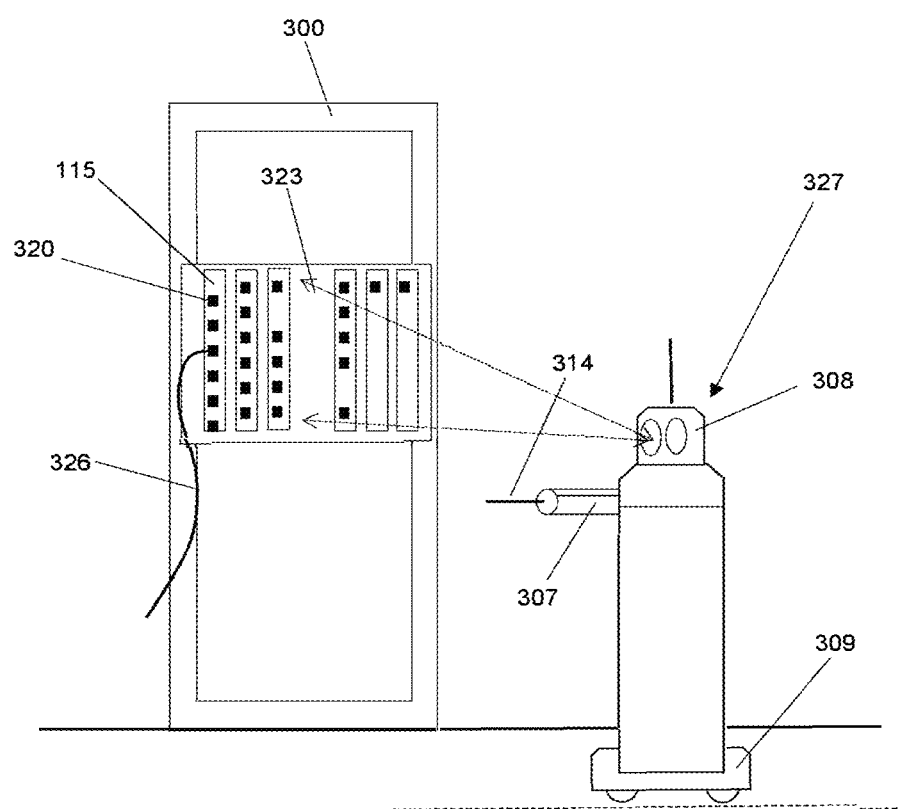
FIG. 4 illustrates the mobile RFID and optical scanning robotic system, wherein the robot is configured to capture optical scans of equipment racks.
Figure 5:
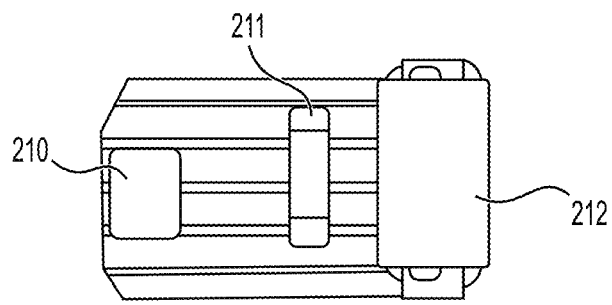
FIG. 5 illustrates a compact implementation of the passive RFID tag, which is folded to form a three-level stacked circuit.
Figure 5:
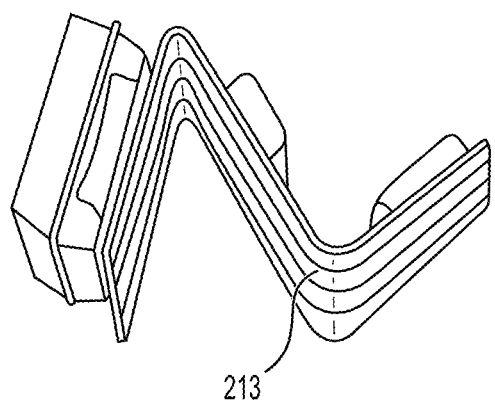
Figure 5:
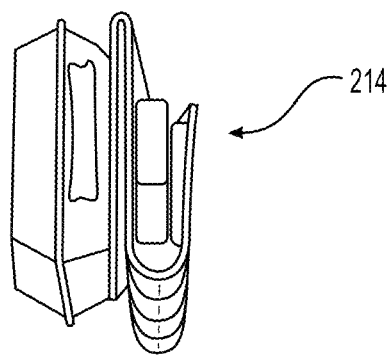

The RFID data measured by the aforementioned techniques are augmented, as shown in FIG. 4, by an optical scanner head 308 on scanning robot 327. The three-dimensional geometry of each network interface panel 323 is captured by optical scanning and by potentially stitching together multiple optical scans to cover the entire rack. Optical scanning allows the location of the connector ports 320 to be determined, referenced, and stored within the database, enabling comparison to future measurements at the same port to determine if the connection status has changed. This location information is used to position the RFID probe arm 323 in the vicinity of the tag during readout. To generate the solid models, three-dimensional optical scanning systems 308 use various techniques, such as LIDAR (Light Detection and Ranging), structured light, scanning lasers, and stereoscopic cameras. In principle, any of these techniques can be used as long as they have sufficient spatial resolution of at least 1 mm. Examples of suitable cameras include the FARO EDGE SCANARM HD with ±25 μm (±0.001 in) accuracy and a fast scan rate of 560,000 points/sec.

Packaged Rfid Passive Receiver/Tag

Figure 6:
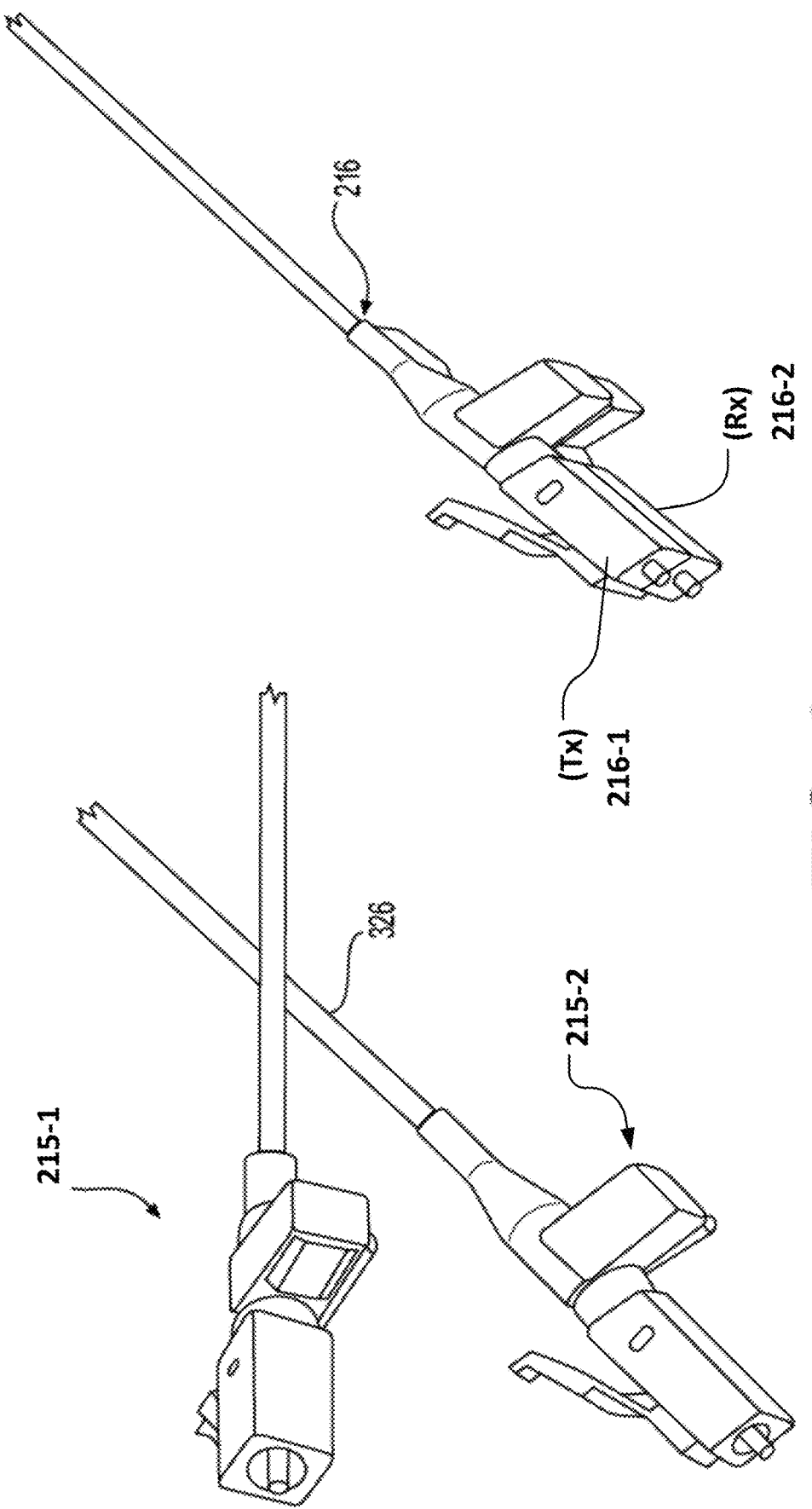
FIG. 6 illustrates RFID tags integrated with common LC fiber optic components, namely LC simplex and duplex connectors.

The apparatus comprised of the passive RFID receiver integrated circuit 210, ferrite core inductor 212, and ceramic capacitor 211 (FIG. 6) is designed to achieve the following unique functional characteristics:

1. High spatial resolution (<5 mm);
2. Passive operation of tag (e.g., no battery or separate power); and
3. Small size (<5 mm on a side).

Figure 7:
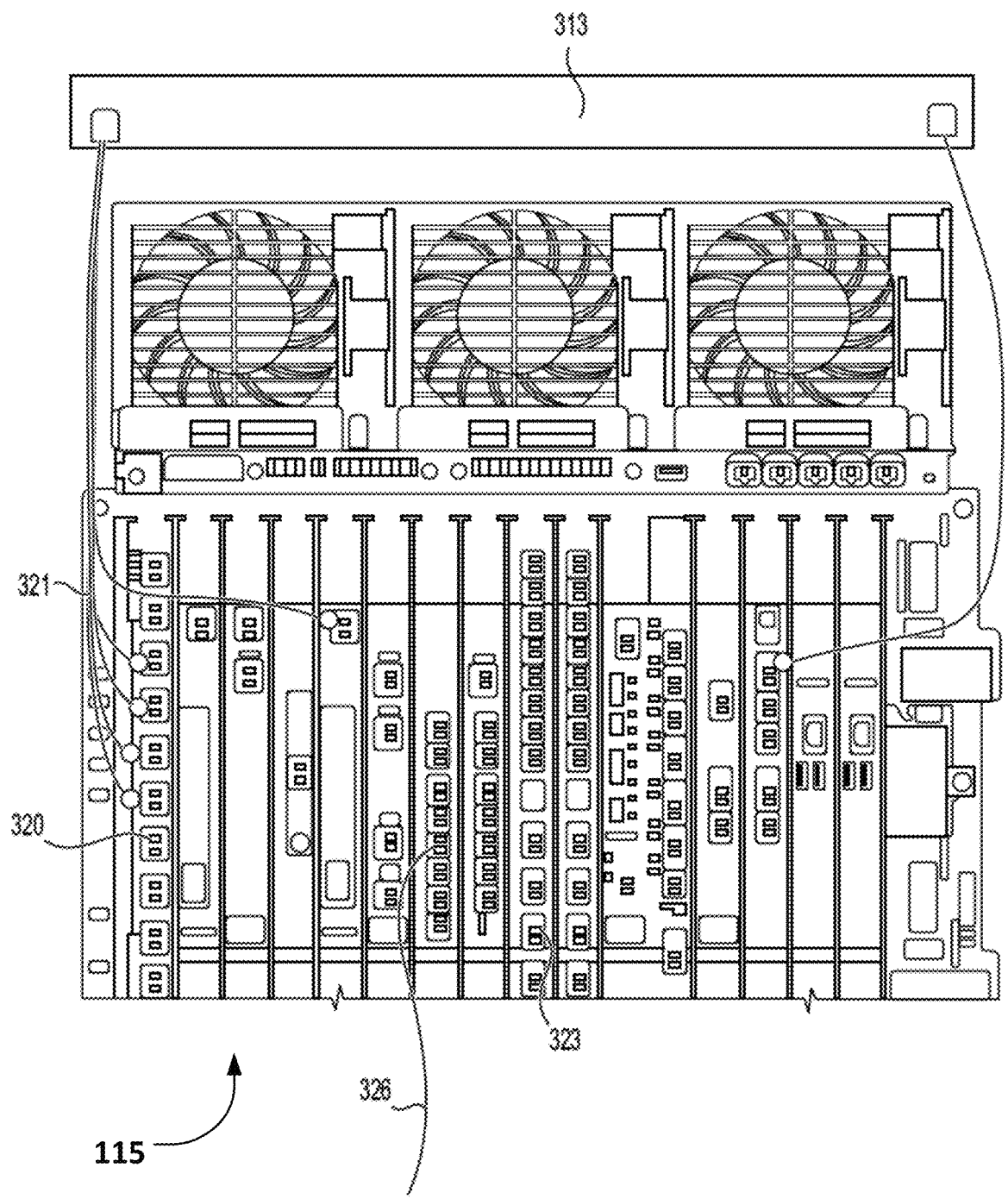
FIG. 7 illustrates a detailed example of a network equipment chassis requiring RFID port identification and tracking instrumented with an array of RFID reader antennae to read RFID tags associated with an array of network ports.

To maintain the high density of traditional fiber optic interconnect systems, it is necessary to produce miniature tags smaller than the size of the fiber optic connector components they are attached to. In a particular form of construction well suited for miniaturization and mass production (FIG. 6), the RFID integrated circuit 210, inductor 212, and capacitor 211 are surface mounted on a miniature flex circuit 213 that can be folded to a compact size and encapsulated to produce the final packaged RFID tag 214. These tags are provided in a variety of packaging (i.e., housing) configurations, including an RFID tag that clips onto standard LC simplex 215 and duplex 216 fiber connectors, as shown in FIG. 7. The plastic tag housing is selected to accommodate attachment methods to the connector. In one example, the tag housing includes a magnetic element enabling magnetic attachment of the antenna array or RFID probe tip to the RFID tag. The magnetic element may be a Neodymium permanent magnet or steel element. Alternatively, the packaged RFID tag can clip onto small form factor LC and MTP/MPO fiber optic connectors.

In a further example, each tag 214 may include an infrared (IR) or optical reflective location marker (e.g., IR reflective tape or coating) that is visible and readily distinguished by an optical scanner. In this case, each passive tag reflects illumination to assist in high-resolution location determination, and each tag reflects the RF signal carrier with a unique amplitude or phase modulation signature impressed therein on the carrier for identification purposes. IR or visible wavelength reflectors may be incorporated on the housing of passive RFID tags 214.

Figure 8:
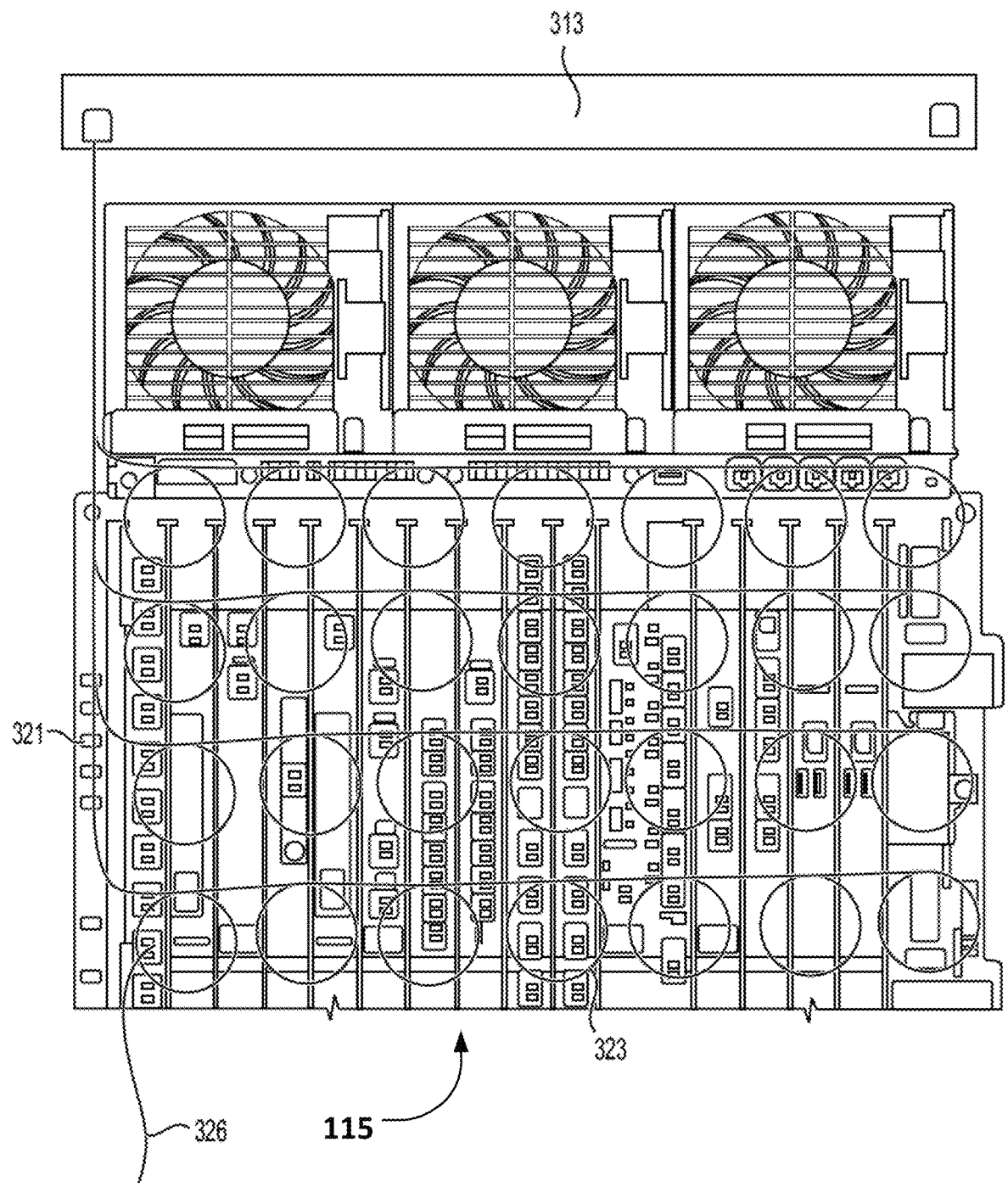
FIG. 8 illustrates a detailed example of a network device incorporating RFID port identification and tracking, instrumented with a distributed array of RFID reader antenna loops for complete coverage RF scanning coverage across an interface panel of the network device.
Figure 9:
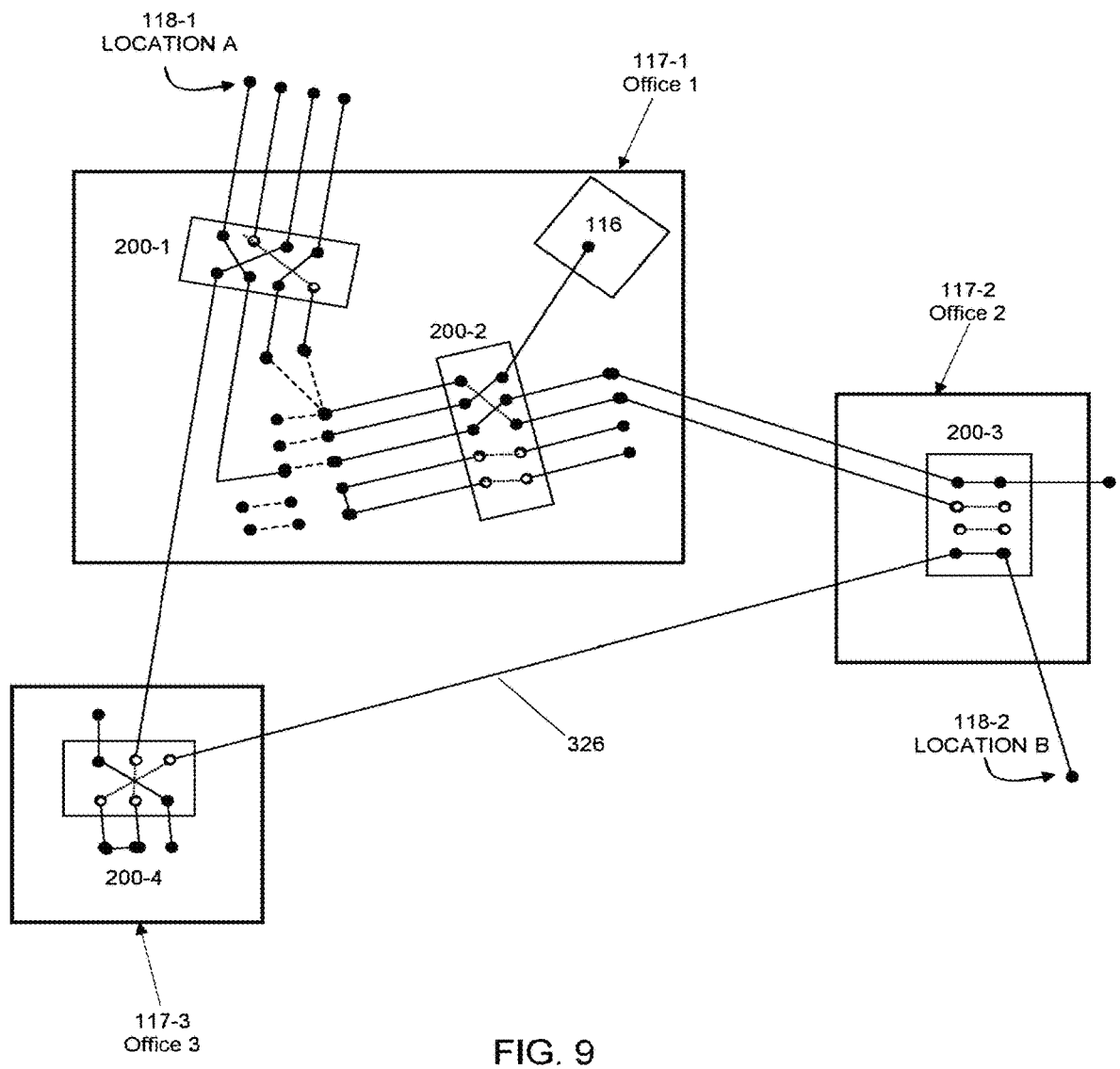
FIG. 9 illustrates a distributed network diagram, including relationships between automated robotic cross-connects, network elements, and the physical interconnections therebetween.

As detailed in FIGS. 8 and 9, a multiplexed, multi-channel RFID reader 313 with individually addressable antenna array 305 can be utilized to provide in-situ, real-time monitoring of RFID tags on a network device (in contrast to deploying the scanning robot system 327 to the network device). Multiplexing of individual antenna elements 304 within the array 305 enables hundreds of tags 214 on cables 326 to be interrogated in rapid time succession by a single reader 313 for near real-time update rates and low upfront cost. An antenna array 305 of individual antenna elements 304, all elements connected to a single multiplexed LF-RFID reader 313, are distributed to the port locations by running the individual antenna wire pairs and attaching each antenna element to the interface panel 327 in the vicinity of each port 320 receiving a fiber optic cable 326, or to each physical asset that is tagged.

In a further example, compact passive RFID tags may be applied not only to the connectors at the ends of cables, but to the connector ports/receptacles, online cards, pluggable optics, etc. This data is processed and automatically entered into a database of physical network links, so that the robot is able also to determine the location of additional data center assets such as transceivers.

In further accordance with this invention, the RFID discovery system enables several additional high-level functions to be performed by software residing on the management server 415. These functions are described next.

Fiber Link Search

The consolidation and processing of spatially overlapping RF and optical scans provide full visibility into the physical link configuration. This enables the software management system (FIG. 1) to provide a physical cable inventory and connectivity search function. Moreover, the search function accesses the stored database of network resources 111, such as type of circuit pack, router port, cross-connect port, wavelength, etc., all of which are identified by unique RFID serial numbers. The system is aware of which existing resources are available to establish connectivity along a target path and achieves high accuracy by eliminating human intervention. For example, if one or more ends of the different cable connections are attached to automated patch panels, the system can switch connections automatically to provision, validate and transfer the necessary resources to support production workflows. In accordance with this invention, an error-free, no-touch, the automated process performs these steps.

Path Visualization

A path or network visualization function 106 presents an accurate and updated representation of the links between tagged network elements and network resources to aid in mapping or in selecting network resources. This is analogous to physical mapping features and representations provided for highways, which are based on prior scanning using satellite imagery, GPS, and automobile equipment with sensors to collect image and position data. Since the network is dynamic, these paths change over time, and up-to-date, accurate data and visualization are essential to maintain reliable operation of the network.

FIG. 9 schematically represents a fiber network map to identify potential links between a location A and a location B. The solid lines represent optical links, and the dashed lines represent electronic links. The distances between offices 117-1, 117-2, 117-3 are not to scale here to illustrate the inter-relationships between connections more clearly. This map includes optical network elements such as the automated fiber cross-connects or patch-panels 200 and test equipment 116 to help visualize the available network resources. As is typical, there are many alternative paths to connect location A 118-1 with location B 118-2. The shortest path or highest bandwidth path may be determined using the Dijkstra algorithm, for example.

Remote Provisioning and Routing

The provisioning automation function 105 in FIG. 1 enables the network to be configured and/or tested in an automatic fashion from a distant, centralized facility such as a network operations center, using existing testing resources for network link connectivity and various network elements. Asset records in database 114 associated with each physical asset may include the functional characteristics, status, identifiers, and locations of the particular network elements. For example, the cabling records 110 in the database 114 may include fiber optic patch cords classified according to their particular fiber types (Single Mode Fiber SMF-28, bend insensitive SM fiber, dispersion shifted fiber, etc.), endpoint locations A and B, and termination types (splice, FC-APC connector, SC-UPC connector, LC-PC connector, etc.). Locations A and B can be described in terms of a particular physical port location within a particular rack, for example.

Typical network elements with physical ports include patch panels, automated fiber cross-connects 200, optical switches, servers, storage devices, and other devices that re-direct signals in the optical domain. Remote routing and process automation are achieved by transmitting interconnect reconfiguration commands to a cross-connect 200 control interface that sends commands to remote, automated fiber optic cross-connects deployed across the network. For example, after the user enters a start and destination location for the establishment of communication services, the processor's routing optimization software module determines one or more alternative paths that meet the selection criteria based on the accurate data ensured by the present invention. If the path can be completed with existing resources and network elements, the process automation software directs the one or more fiber optic cross-connects along the path to switch, such that the path of fiber links joined end-to-end to form a contiguous communication path meeting the user's selection criteria. Moreover, network elements may include pluggable optics or transceivers, common network interfaces on packet switches and routers, operating at specific data rates, transmission protocols, wavelengths, and formats.

The physical interconnection discovery and management system disclosed herein offers significant advantages to providers of high-bandwidth telecommunications services, including same-day and one-touch provisioning of high-bandwidth fiber optic services. The ability to dynamically update an accurate map of the physical network topology, coupled with the ability of physical network interconnections to be reconfigured from a remote network operations center, enables the labor and time-intensive provisioning and maintenance processes to be fully automated.

In a further embodiment of this invention, the process of implementing automated physical network configuration management is disclosed. The information from multiple RFID scans 119, as well as registered and calibrated optical scans 113, and the stored database of annotated solid models of network equipment, is processed by the analysis module 107 on server 415 and then merged to create a virtual physical model of data center in 112. This process utilizes the following steps:

1. If the solid model of network equipment interface panels 237 (including the interface ports to which cables are attached) is not already available, the network device is optically scanned in three dimensions to produce a solid model of its interface panel. This is done using standard 3D scanning software to produce, for example, a standardized .STP or .IGS formatted file;
2. A solid model is created for at least the interface panel of the device, with location of each port within the three-dimensional model of the device identified;
3. An annotated solid model is stored in network element port module 111 of database 114;
4. The process is repeated for other network devices.

Figure 10:
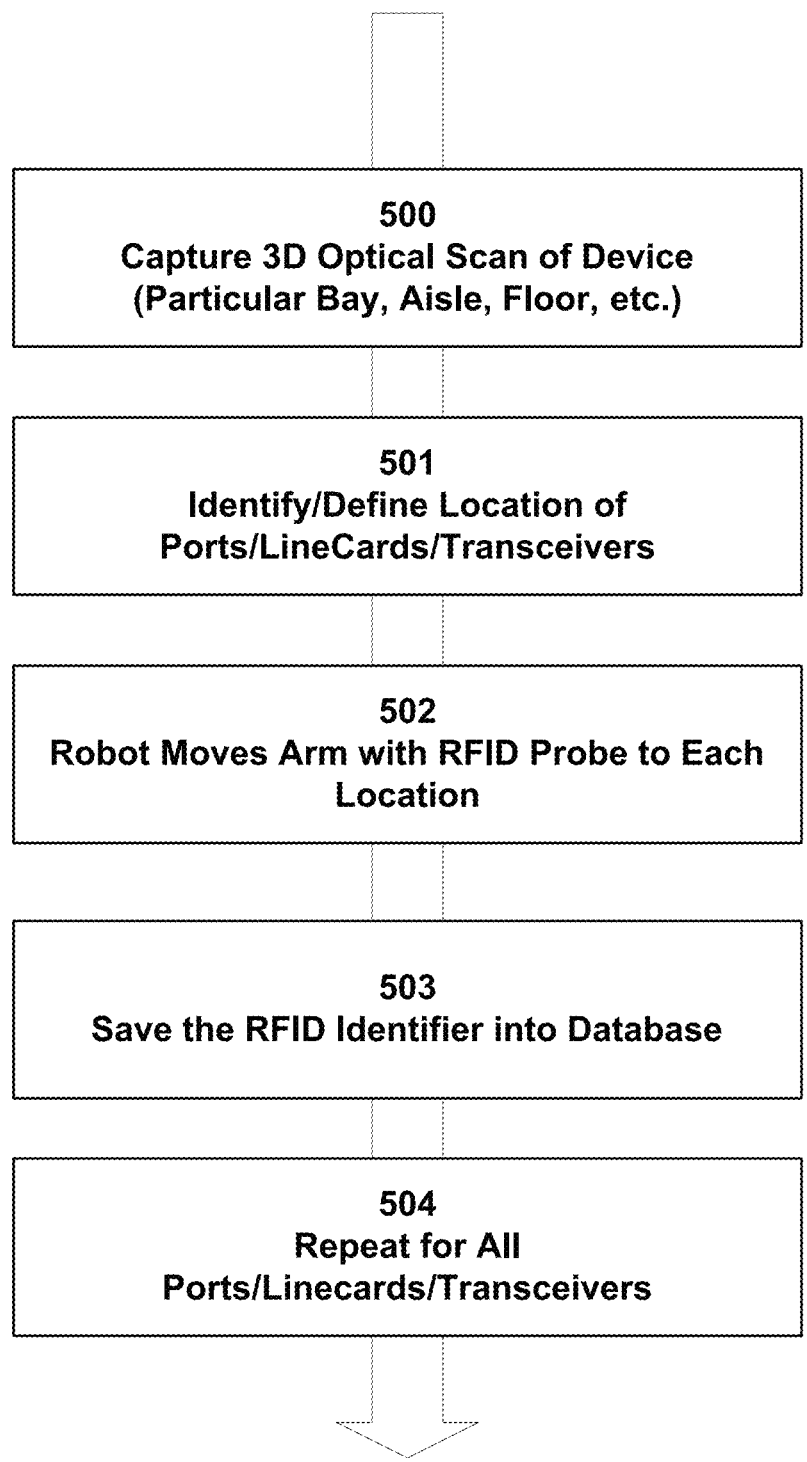
FIG. 10 is a flow chart of the process of training the system in accordance with the preferred embodiment of the present invention to discover initial RFID port locations and identifiers.

It is necessary to discover and map the network connectivity when the network elements are initially installed and deployed. The multi-step training/setup process at the time of installation is summarized in the flow chart of FIG. 10. In step one, 500, 3D optical scans of the network device are captured by the scanning robot to calibrate its position relative to rack 300. In step two, 501, the locations of ports across panel 237 are extracted by comparison to three-dimensional annotated models stored after an initial data collection process. In step three 502, the robot moves the arm to position the RFID probe adjacent to each port location within the detection range of a few mm. In step four, 503, the RFID identifier of any tag associated with that port is read out and stored in the connectivity database. This process is then repeated for each network device in step five 504. The detailed process is described below:

1. Equipment/Racks/Bays are installed;
2. 3D optical and RF scans are performed by dual mode robot system 327; scans are calibrated based on known reference locations;
3. Data from multiple optical scans are stored in scan raw data module 113;
4. Data from multiple RF scans are stored in RFID raw data module;
5. Location of each RFID tag on the network device model is determined by processing data performed using collected data;
6. Potentially, line cards, chassis, etc., are also automatically identified by processing optical scan data 113;
7. Measured RFID tag identifiers associated with each port are saved in Connectivity records 112; and
8. The process is repeated for other network devices.

Figure 11:
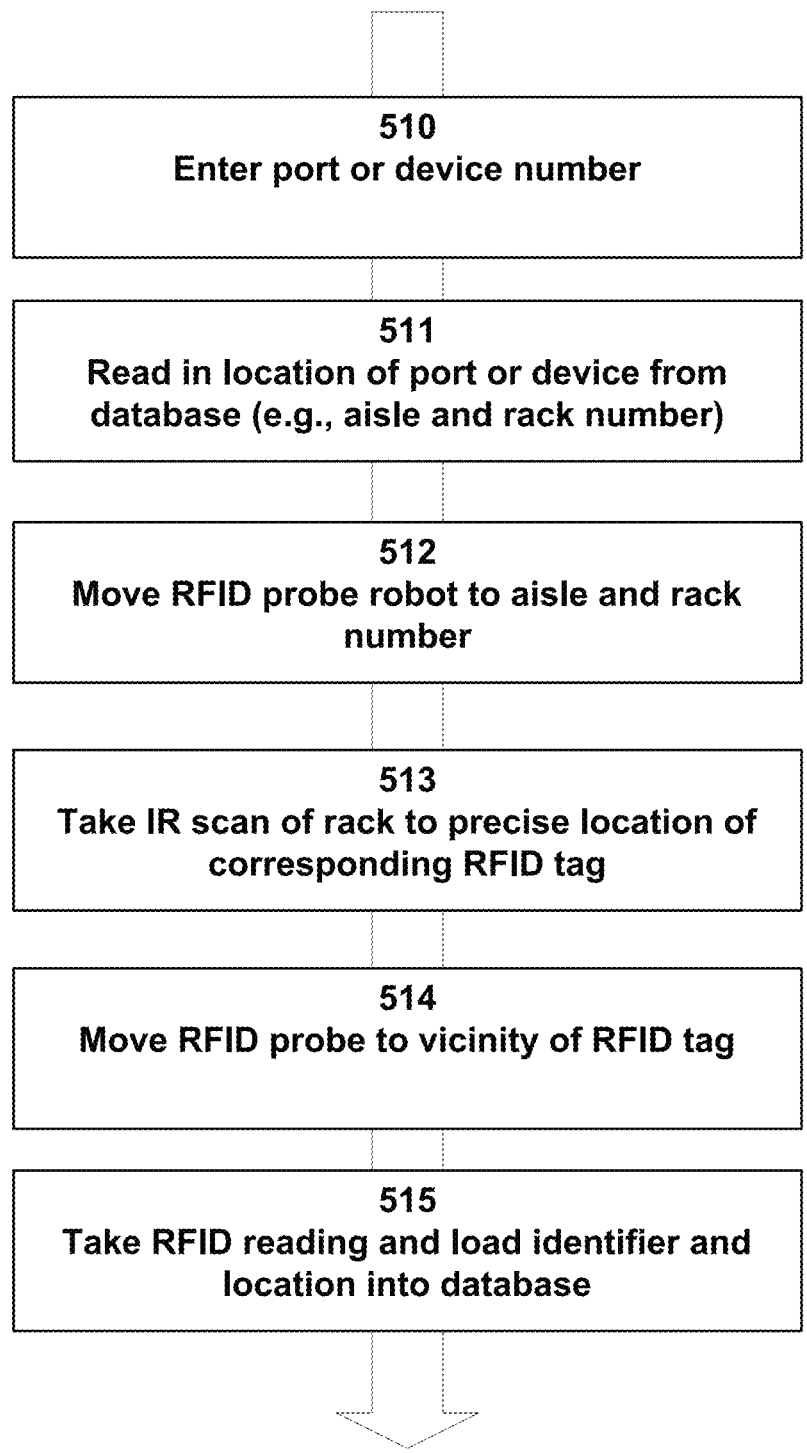
FIG. 11 is a flow chart of the process in accordance with the preferred embodiment of the present invention of monitoring of the physical network topology.

After this initial installation process is completed, the network should be periodically monitored at later times to ensure continued accuracy of the connectivity database. A flow chart of the physical network topology monitoring process is illustrated in FIG. 11 and is summarized below:

1. Select a port or device number for interrogation in step one 510;
2. Read in location of the port or device from the database to get, for example, the aisle, rack number, and coordinates relative to a given reference location in step two 511;
3. Move robot with the RFID probe to coordinates in step three 512;
4. Take a calibration scan of the rack and determine precise location of the corresponding RFID tag in step four 513;
5. Move RFID probe adjacent the RFID tag in step five 514; and
6. Perform RFID reading and load identifier and location into database 114 in step six 515.

In summary, the network configuration management system disclosed herein enables the physical network connectivity to be discovered and tracked in a fully automated way. The physical location of any of a multiplicity of densely distributed RFID tags 214 is determined by a mobile RFID robot's three-dimensional optical scanner module 308. The scanner creates the three-dimensional model of the particular equipment rack fiber optic interface surface, and the location of tags 214 corresponding to ports 320 are stored along with the model. The port locations from the scan are used to position the RFID probe 314 to within several mm of any of the multiplicity of RFID tags for close-range readout. Passive RFID tags are located at connector ports, line cards, etc., and are automatically entered into a database of physical network links.

To position the actuable RFID readout probe to within several mm of any of the multiplicity of RFID tags for close-range readout one at a time, the navigation of the robotic RFID and optical scanning system 327 through the data center can be guided by reference markers or fiducials on the floor, network elements, bays or racks. To navigate through the data center during the data acquisition process, the robot includes a motorized, wheeled drive platform 309 that transports it along the floor. In a particular example, a floor grid-sensing device and/or gyroscope are used to determine the position of the robot within the data center while also providing sensing for collision avoidance. The robot navigation may be associated with a training process in tandem with a technician to assist in avoiding obstacles (e.g., stray cables, boxes, open door of enclosure, etc.) while scanning the tags. This is typically done at the time each network device is installed.

The robot RFID reader probe 314 is attached to the distal end of an actuated probe arm 307 and is sufficiently compact to be able to access each port in the network device's interface panel despite any surrounding obstructions such as network cables, etc. The optical scanning module locates the tags based on the stored database of coordinates so that the RFID probe 314 can be driven to the correct physical location for tag readout. This stored location is subsequently used to guide the probe arm 307 and the RFID probe attached therein to the vicinity of the RFID tag 214 for proximity readout. The robot scanning system 327 includes both RF and optical scanning capabilities. A centralized server 415 processes the scan data and communicates with the controller module 405 of the robot scanning system 327 through a wireless communications link. A battery and charging module 406 power the system 327. The wireless module 311 is used to establish communication between the robot system 327 and the server 415. The three-dimensional camera 308 is used to scan the equipment and locate the tags so that the RFID probe can be properly positioned next to any tag. The RFID probe module 314 comprises the high spatial resolution/close-range RFID probe antenna and the associated RFID demodulation electronics.

Figure 12:
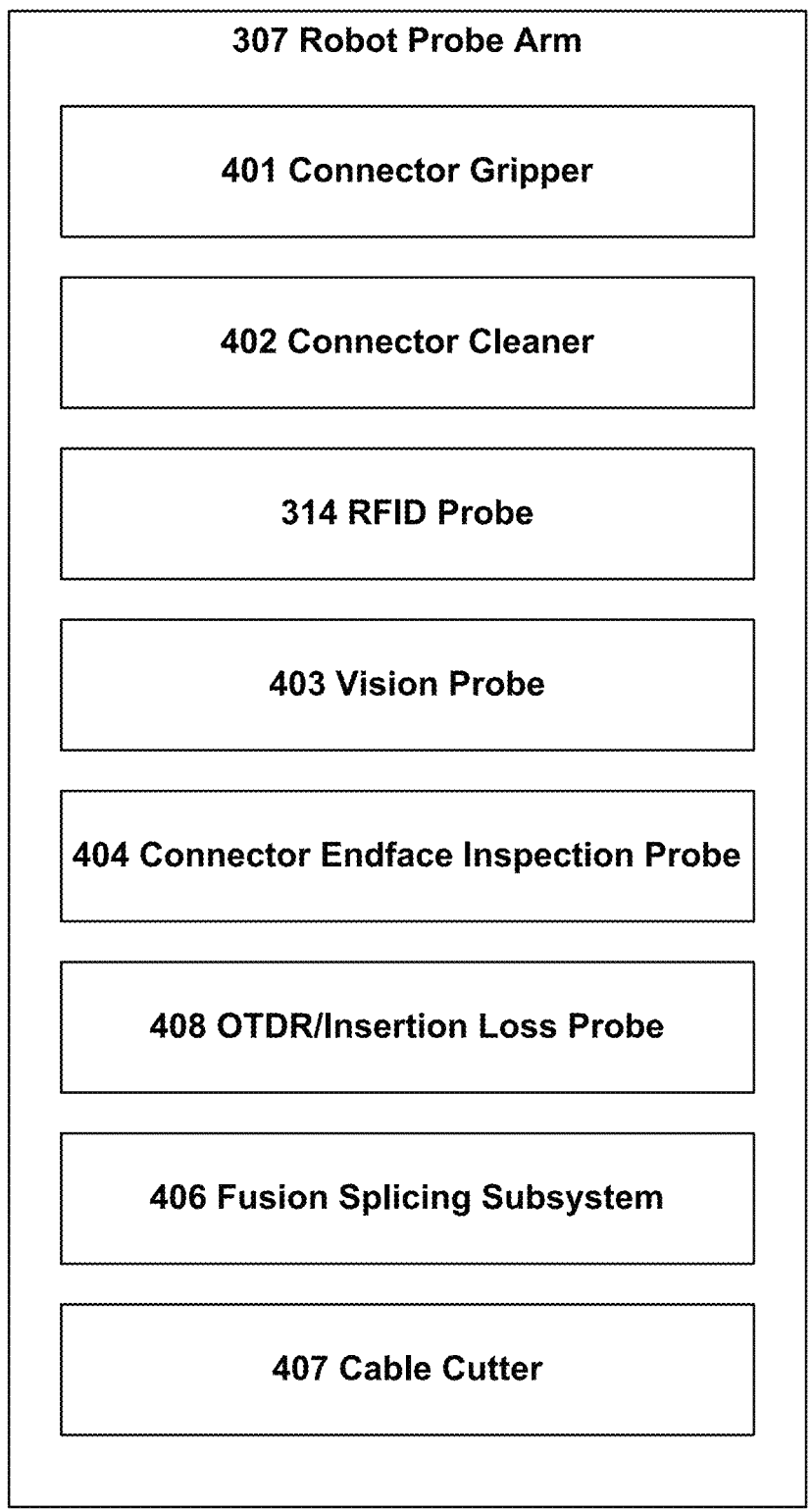
FIG. 12 is a block diagram of the multi-functional robot probe arm comprised of multiple tools according to exemplary embodiments hereof.

FIG. 12 is a block diagram of the multi-function robot probe arm 307 with RFID probe 314 and connector gripper 401, including one or more tools from the set, including a connector cleaner 402, vision probe 403, connector endface inspection probe 404, OTDR/Insertion loss probe 408, fusion splicing device 406, and fiber cable cutter 407. This multi-function robot probe arm 307 may include any combination of these end-effector "tools" under the control of the robot controller module 405 (FIG. 1) receiving instructions from the management server 415 (FIG. 1). The robot arm 307 is able to precisely position any of these tools relative to the connectors of network elements 115 to perform the selected function.

In particular, the connector gripper 401 is able to latch onto a connector, unplug it from the port, direct the connector end with its corresponding free length of cable (i.e., providing a service loop), and engage the connector into one of many devices, including the connector cleaner 402, OTDR/insertion loss measurement system 405, fiber cable cutter 407, or fusion splicing system 406. The gripper 401 includes electronic sensors such as photointerrupters, proximity switches, and microswitches to detect the proper engagement of the connector into the gripper. The gripper is actuated to unplug or plug in along a longitudinal axis defined by the mating adapter and produce a plug-in and unplug force of about 5 N or more.

In a further example, the connector cleaner 402 dispenses a section of cleaning fabric so that the connector gripper 401 can swipe a connector endface across the cleaning fabric to remove any debris or contaminants. The connector ferrule is typically 1.25 mm or 2.5 mm in diameter or is a rectangular MT ferrule. The length of a swipe across the cleaning fabric is typically 2 to 5 times the ferrule diameter or width.

In a further example, the fiber connector ferrule endface inspection probe 404 includes a high-resolution autofocus microscope, CCD or CMOS camera, frame grabber, and machine vision system with magnification lens system to capture images of the fiber endface of a connector, including for those connectors plugged into the backside of a mating adapter. The system is able to see particulates and contamination on the ferrule endface, particularly in the center 50-micron diameter region centered on the optical fiber core. The probe 404 can receive a male fiber optic connector ferrule (1.25 mm or 2.5 mm diameter) of the external cable, or it can be inserted into the female receptacle of a mating adapter with the opposing internal connector ferrule at a central location within the split sleeve of the adapter. Patch panels typically comprise an array of such mating adapters with female receptacles and cables preinstalled on the backsides of the adapters. In accordance with aspects of this invention, the mobile robot 327 is able to manipulate the connector(s) 215 or 216 installed on the front side of the patch panel or network element 115 so that the external and internal connector endfaces can be cleaned and inspected.

In a further example, the vision probe 403 includes a CCD or CMOS camera, frame grabber, and machine vision system to accurately determine the identity and location of connectors 215, 216, and ports 320. This enables connector gripper 401 to align properly with and engage the connector without jamming. Suitable connectors include industry standards such as LC, SC, FC, CS, SN, MDC, MPO, MTP, and MU with PC, UPC, or APC endface polish.

In a further example, the OTDR/insertion loss probe 408 includes a fiber optic connector and cable, which is robotically connected to the device or link under test at the cable's distal end. The cable is connected to optical measurement instrument(s) at its proximal end. Optical measurement instruments may include an Optical Time Doman Reflectometer (OTDR) to measure backreflection and insertion loss along the length of the cable. It may also include a light source (e.g., 1550, 1310, 850 nm visible laser) and optical power meter.

In another example, the robot arm can be used to repair damaged fibers and replace damaged connectors. The fusion splicing system 406 includes chucks to receive and manipulate ends of the fiber, as well as a fusion splicer to cut, clean, cleave, and splice fibers and/or fibers with connectors. In a further example, the fiber cable cutter 407, an electrically actuated device, can be used to cut through the fiber optic cable, including the Kevlar reinforcement strands used in standard cable 326 constructions.

Figure 13:
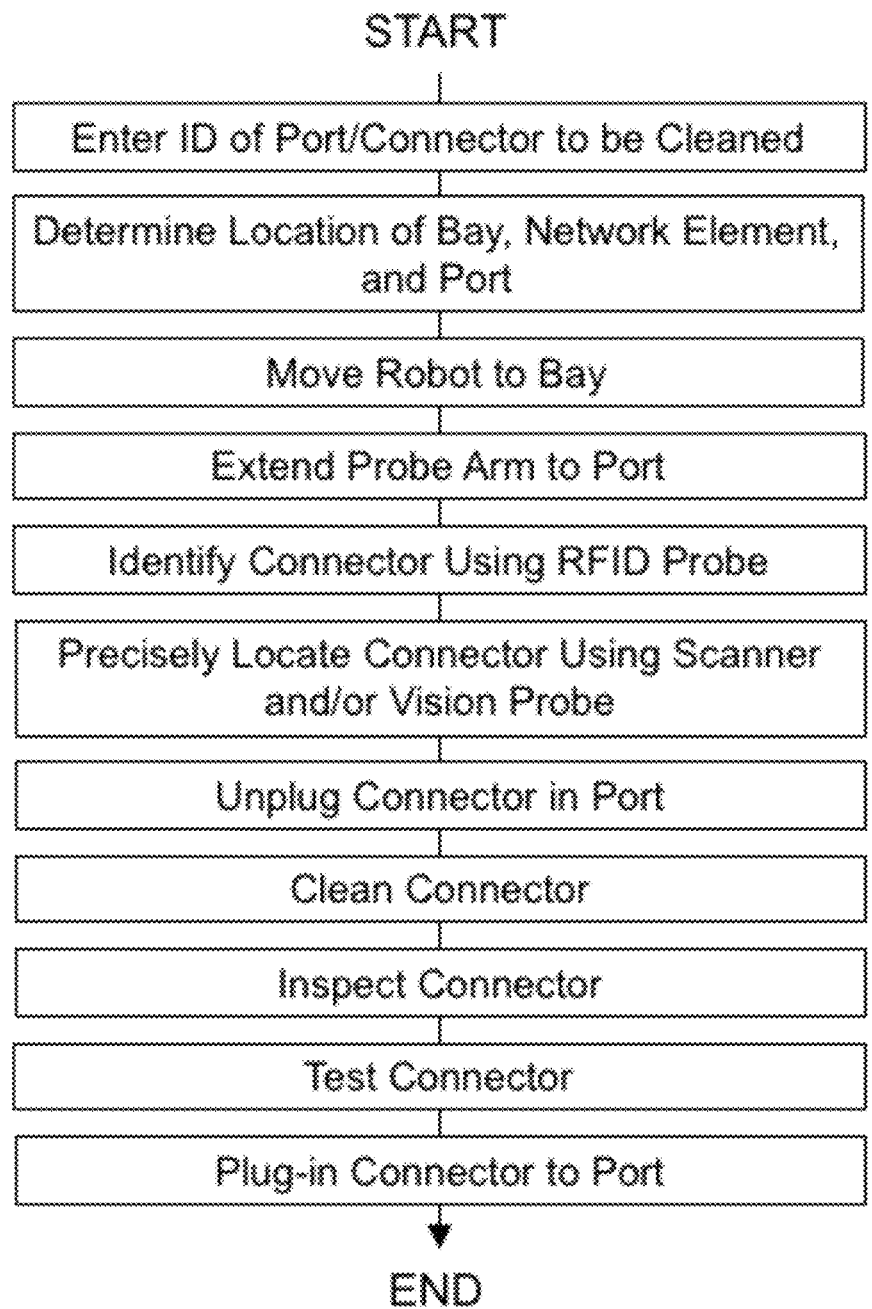
FIG. 13 is a flow chart of a robotic process to unplug, clean, inspect, and test a connector according to exemplary embodiments hereof.

FIG. 13 is a flow chart of an exemplary method to robotically unplug, clean, inspect, and test a connector plugged into a port on a network element such as a standard patch-panel augmented with RFID-tagged connectors, comprising the following steps:
1. Enter the ID of the port/connector to be cleaned
2. Determine the location of bay 300, network element 115, and port 320
3. Move robot 327 to bay 300
4. Extend probe arm 307 to connector in port 320
5. Identify connector 215 or 216 using RFID probe 314
6. Precisely locate the connector using vision probe 403 and/or scanner 308
7. Unplug connector 215 or 216 in port 320 using connector gripper 401
8. Clean connector using connector cleaner 402
9. Inspect connector endface using connector endface inspection probe 404
10. Test connector using OTDR/insertion loss probe 408
11. Plug in connector 215 or 216 back into port 320.

Figure 14:
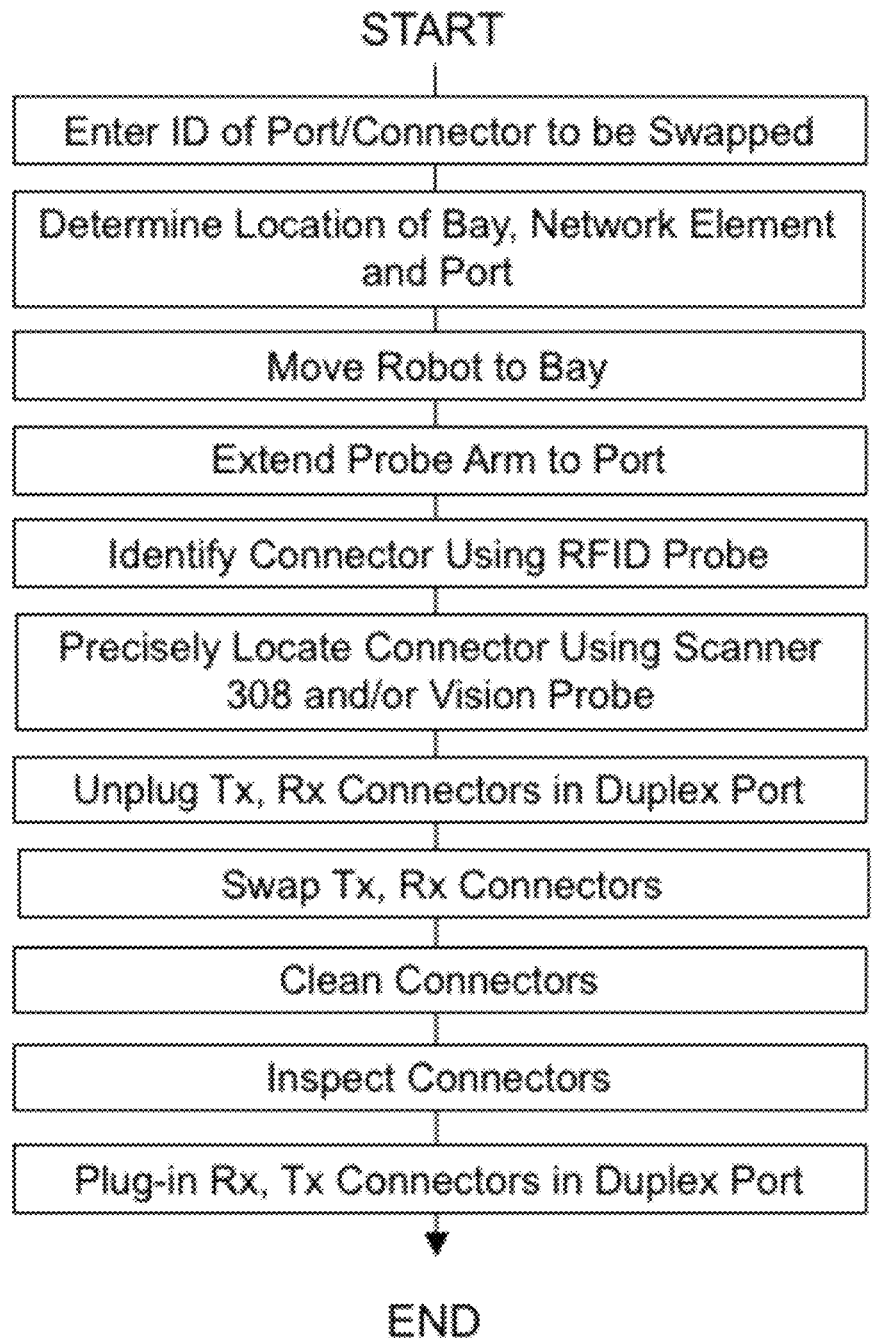
FIG. 14 is a flow chart of an exemplary robotic process to swap mis-installed Tx and Rx connectors.

A common problem in networks is the incorrect installation of duplex fiber optic connectors by technicians. Duplex connectors are typically constructed of a separate transmit and receive connector (for example, two independent LC-UPC ferrules) that can each be plugged into their corresponding union adapters independently. It is not uncommon for these connectors to be incorrectly swapped when plugged in. To correct this in a hands-free manner, FIG. 14 depicts a flow chart of an exemplary method to robotically swap the transmit (Tx) and receive (Rx) connectors of a duplex fiber optic link. The exemplary method comprises:
1. Enter the ID of the port/connector to be swapped
2. Determine the location of bay 300, network element 115, and duplex port 320
3. Move robot 327 to bay 300
4. Extend probe arm 307 to Tx, Rx connectors in duplex port 320
5. Identify connectors 216-1, 216-2 in duplex port 320 using RFID probe 314
6. Precisely locate the connector using vision probe 403 and/or scanner 308
7. Unplug Tx, Rx connectors 216-1, 216-2 in duplex port 320 using connector gripper 401
8. Swap Tx, Rx connectors 216-1, 216-2
9. Clean connectors using connector cleaner 402
10. Inspect connector endfaces using connector endface inspection probe 404
11. Plug-in Rx, Tx connectors 216-2, 216-1 back into duplex port 320.

Figure 15:
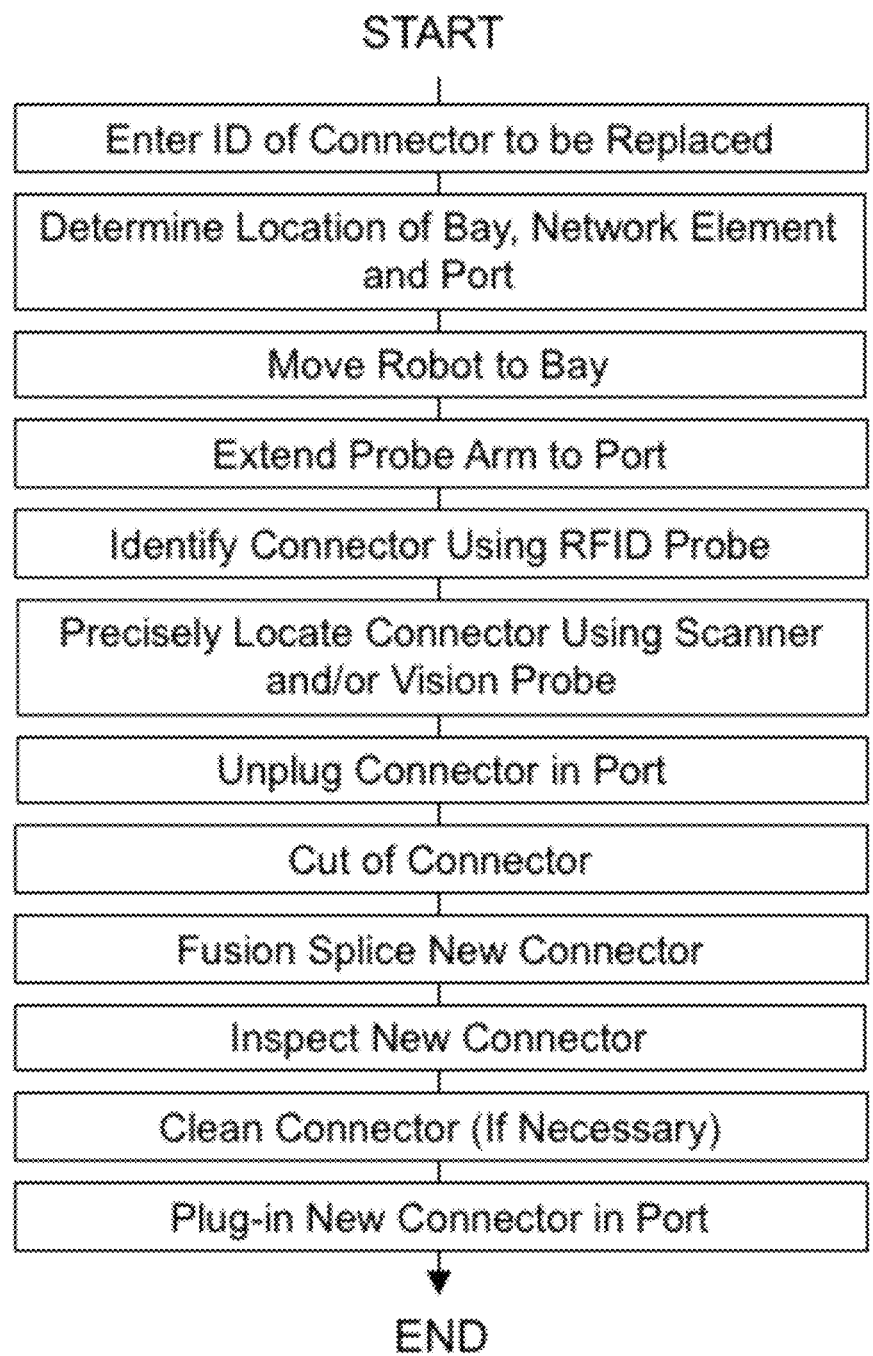
FIG. 15 is a flow chart of a robotic process according to exemplary embodiments hereof to fusion splice a replacement connector.

Another common problem when operating fiber optic networks is damage to fiber optic connectors due to incorrect installation or cleaning. It is therefore of great value to develop a process to fix connectors in an automated way. Accordingly, FIG. 15 is a flow chart of an exemplary method to replace a damaged fiber optic connector robotically. The exemplary method comprises:
1. Enter the ID of the port/connector to be replaced
2. Determine the location of bay 300, network element 115, and port 320
3. Move robot 327 to bay 300
4. Extend probe arm 307 to connector in port 320
5. Identify connector 215 or 216 using RFID probe 314
6. Precisely locate the connector using vision probe 403 and/or scanner 308
7. Unplug connector 215-1 in port 320 using connector gripper 401
8. Cut off connector 215-1 from the cable using cable cutter 407
9. Splice a new connector 215-2 using fusion splicing system 406
10. Inspect new connector endface using connector endface inspection probe 404
11. Clean new connector if needed using connector cleaner 402
12. Plug new connector 215-2 into port 320.

In a further example of the robotic system 327 (FIG. 16), one or more robot arms 307 are attached to the moveable platform and include hand-like grippers 409 attached to the tool receiving end of each arm 307. The robot arm 307 may have 6 degrees of freedom or axes. The hand-like gripper includes three to five actuable fingers and, as a result, is able to perform a wide range of grasping tasks to execute a wide range of multi-step management and maintenance processes.

In particular, the "Shadow Dexterous Hand" is one example of a commercially available actuated hand with 5 fingers and 20 or more independent degrees of freedom. It provides grasping forces and precision of movement comparable to a human hand. This translates into versatility in its ability to grip tools and parts, both large and small.

In general, the hand-like gripper 409 is able to grasp and unplug/plug in all types of connectors, including fiber optic and electrical connectors and plugs. Preferably the hand-like gripper 409 is of a similar size to a technician's hand. The hand-like gripper 409 is further able to grasp and manipulate tools such as a screwdriver, key, or fiber optic connector cleaner 402. Moreover, it can open doors and remove panels on racks and replace power supplies, etc. Additionally, the robotic system 327 can cycle the power of servers, Ethernet switches, routers, generators, etc., and it can install and replace pluggable optics, servers, fuses, line cards, etc.

Figure 16:
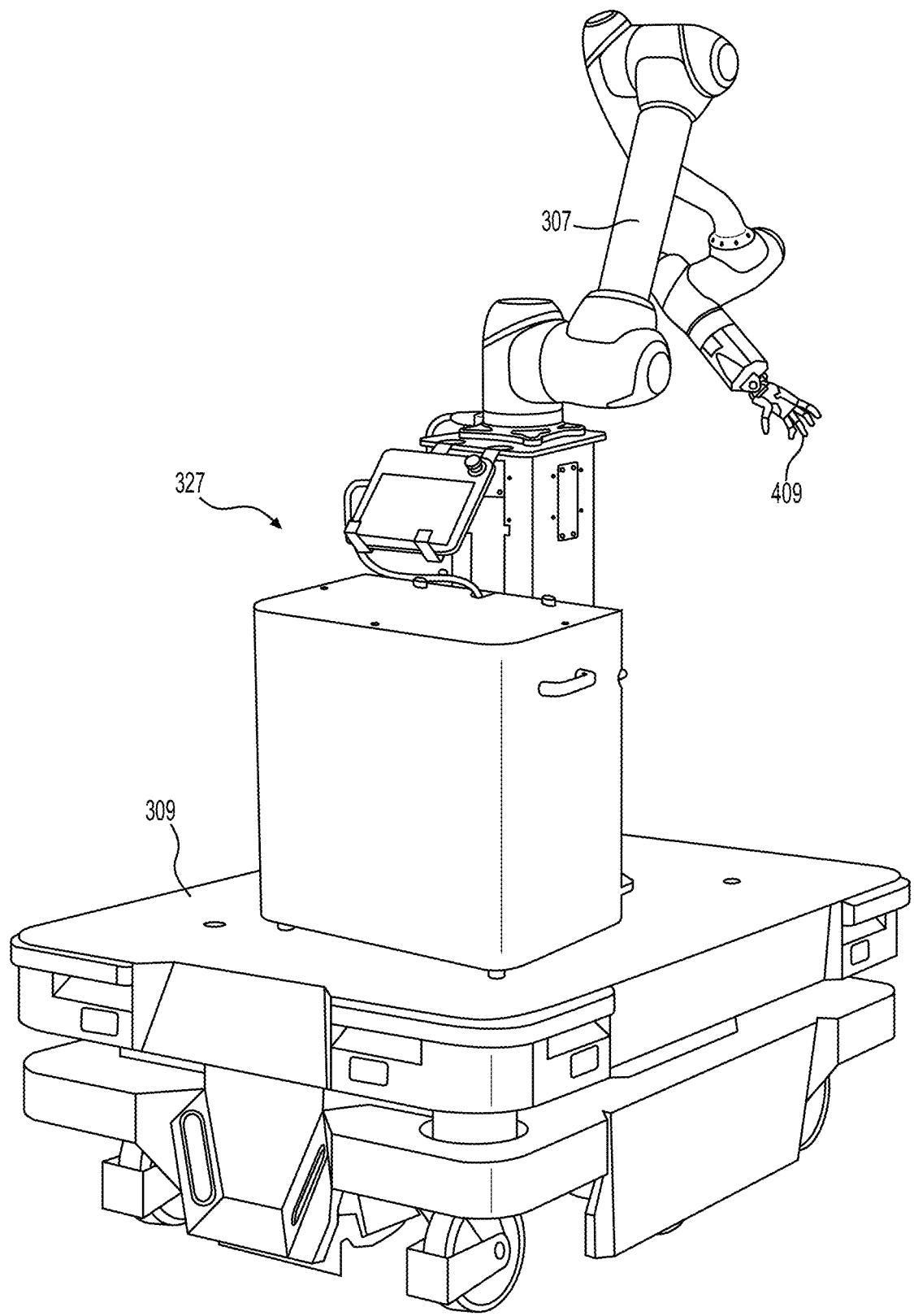
FIG. 16 depicts aspects of a robotic system according to exemplary embodiments hereof.

Although the drawing in FIG. 16 shows only one robot arm 307, as noted, the system may include multiple robot arms. When multiple arms are included, they may, but need not be, homogenous. Different arms may, e.g., have different degrees of movement and/or support different hands (or grippers). Different arms and/or hands may be used to support different tasks or aspects of a task.

The moveable platform 309 at the base of the robot arm(s) 307 can further support test equipment (e.g., OTDR or insertion loss test set) and/or a fusion splicing system 406, etc. This equipment is preferably powered by a battery on the platform. The platform is able to navigate along the aisles of the data center and service any bay 300 within the data center. The system also includes safety sensors to ensure that technicians are outside the work envelope of the robot arm. Otherwise, the one or more arms are temporarily stopped.

In the above examples, the mobile robot platform integrates one or more tools that enable multiple functions to execute routine maintenance and management tasks. Additional tasks performed by the robot include the attachment of labels, barcodes, or tags to the cable and their readout. Physical layer management tasks can also be scheduled during off-hours to minimize potential impact on operations, and a single mobile robot can be leveraged across an entire facility, regardless of size. The use of an automated system also ensures proper execution and documentation of each of the above processes. As a consequence, this system increases the overall reliability and resiliency of the data center while reducing labor costs and unpredictable delays.

CONCLUSION

Where a process is described herein, those of ordinary skill in the art will appreciate that the process may operate without any user intervention. In other embodiments, the process includes some human intervention (e.g., an act is performed by or with the assistance of a human).

As used herein, including in the claims, the phrase "at least some" means "one or more" and includes the case of only one. Thus, e.g., the phrase "at least some ABCs" means "one or more ABCs" and includes the case of only one ABC.

As used herein, including in the claims, the term "at least one" should be understood as meaning "one or more" and therefore includes both embodiments that include one or multiple components. Furthermore, dependent claims that refer to independent claims that describe features with "at least one" have the same meaning, both when the feature is referred to as "the" and "the at least one."

As used herein, including in the claims, the phrase "using" means "using at least" and is not exclusive. Thus, e.g., the phrase "using P" means "using at least P." Unless specifically stated by the use of the word "only," the phrase "using P" does not mean "using only P."

As used herein, including in the claims, the phrase "based on" means "based in part on" or "based, at least in part, on" and is not exclusive. Thus, e.g., the phrase "based on proximity" means "based in part on proximity" or "based, at least in part, on proximity." Unless specifically stated by the use of the word "only," the phrase "based on P" does not mean "based only on P."

In general, as used herein, including in the claims, unless the word "only" is specifically used in a phrase, it should not be read into that phrase.

It should be appreciated that the words "first" and "second" in the description and claims are used to distinguish or identify and not to show a serial or numerical limitation. Similarly, the use of letter or numerical labels (such as "(a)," "(b)," and the like) are used to help distinguish and/or identify and not to show any serial or numerical limitation or ordering.

As used herein, including in the claims, the terms "multiple" and "plurality" mean "two or more" and include the case of "two." Thus, e.g., the phrase "multiple ABCs" means "two or more ABCs" and includes "two ABCs." Similarly, e.g., the phrase "multiple PQRs," means "two or more PQRs," and includes "two PQRs."

As used herein, including in the claims, singular forms of terms are to be construed as also including the plural form and vice versa unless the context indicates otherwise. Thus, it should be noted that as used herein, the singular forms "a," "an," and "the" include plural references unless the context clearly dictates otherwise.

Throughout the description and claims, the terms "comprise," "including," "having," and "contain" and their variations should be understood as meaning "including but not limited to" and are not intended to exclude other components unless specifically so stated.

It will be appreciated that variations to the embodiments of the invention can be made while still falling within the scope of the invention. Alternative features serving the same, equivalent, or similar purpose can replace features disclosed in the specification unless stated otherwise. Thus, unless stated otherwise, each feature disclosed represents one example of a generic series of equivalent or similar features.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims.

Those skilled in the art will readily observe that numerous modifications and alterations of the system and apparatus may be made while retaining the teachings of the invention. Accordingly, the above disclosure should be construed as limited only by the metes and bounds of the appended claims.

I claim:

1. An RFID (radio-frequency identification) tracking system for data center assets for automatically discovering and tracking a configuration of a multiplicity of cables terminated in connectors and connected to one of a multiplicity of numbered connector receptacles, the system comprising:

one or more equipment racks, including networked devices therein with multiple spaced apart connector receptacles therein, each equipment rack having an RFID tracking module operating at a given frequency with an upstream network management interface and a downstream array of short-range RFID readout antenna elements, each antenna element being individually addressable by a multiplexing circuit;

a multiplicity of fiber optic cables, each having a pair of terminating connectors, each cable including an RFID tag with a corresponding tag identifier and with less than 5 mm readout range attached in the vicinity of each said terminating connector;

the array of RFID readout antenna elements attached to equipment or patch panels, such that each short-range antenna element is located in the vicinity of a corresponding numbered connector receptacle and able to read out an RFID tag identifier of any of the multiplicity of cables connected to the corresponding numbered connector receptacle; and a remote management server for storing data of the RFID tag identifier associated with each of the multiplicity of cables, the identifiers associating each RFID antenna element with a particular numbered connector receptacle, wherein a volume of an RFID tag is less than 200 cubic millimeters, and wherein the RFID tags are energized passively by a close-coupled RF excitation signal and comprise an integrated circuit and an inductor and capacitor forming a resonant circuit.

2. The system of claim 1, wherein said fiber optic cables are 1 to 1000 meters long and said terminated connectors comprise LC, SC, FC, CS, SN, MDC, MT, and/or MTP/MPO connectors.

3. The system of claim 1, wherein the RFID readout antenna elements are each substantially similar in size and less than about 100 mm in length and width.

4. The system of claim 1, wherein the given frequency is about 125 kHz.

5. The system of claim 1, wherein the resonant circuit is tuned to be selectively responsive to the given frequency.

6. The system of claim 1, wherein the RFID readout antenna elements are in a planar configuration on a flexible plastic substrate.

7. The system of claim 6, wherein the flexible plastic substrate includes a pressure-sensitive adhesive backing layer to affix the antenna to a surface of the networked device in the vicinity of the connector receptacle.

8. The system of claim 1, wherein the upstream network management interface utilizes an Ethernet interface.

9. The system of claim 1, wherein the RFID tag is housed within a plastic injection-molded clip element that positions the RFID tag in alignment with the particular antenna element and with a separation of no more than 4 mm.

10. The system of claim 1, wherein peak voltage at the given frequency on the short-range antenna element is greater than 10 volts.

11. The system of claim 1, wherein the tag identifier comprises an 8-bit or larger digital identifier.

12. The system of claim 1, wherein the RFID tag is passive and does not require a battery.

13. The system of claim 1, wherein the networked devices include one or more of: manual patch-panels and/or programmable patch-panels, and/or optical circuit switches, and/or optical test equipment, and/or packet monitoring devices, and/or packet switches, packet routers, and/or servers, and/or storage devices, and/or fiber optic transport systems.

14. The system of claim 1, wherein the short-range antenna element comprises a parallel arrangement of an unshielded inductor and a capacitor.

15. The system of claim 14, wherein the unshielded inductor and the capacitor are on a printed circuit substrate.

16. The system of claim 14, wherein the inductor has an inductance of at least 1 millinery.

17. The system of claim 1 wherein the RFID tags are less than 5 mm per side.

18. The system of claim 1, wherein
the RFID tag associated with each is attached within no more than 4 mm of each corresponding terminating connector.

19. The system of claim 1, wherein each short-range antenna element is located no more than 4 mm from a corresponding numbered connector receptacle.

20. An RFID (radio-frequency identification) tracking system for data center assets for automatically discovering and tracking a configuration of a multiplicity of cables terminated in connectors and connected to one of a multiplicity of numbered connector receptacles, the system comprising:

one or more equipment racks, including networked devices therein with multiple spaced apart connector receptacles therein, each equipment rack having an RFID tracking module operating at a given frequency with an upstream network management interface and a downstream array of short-range RFID readout antenna elements, each antenna element being individually addressable by a multiplexing circuit;

a multiplicity of fiber optic cables, each having a pair of terminating connectors, each cable including an RFID tag with a corresponding tag identifier and with less than 5 mm readout range attached within 4 mm of each said terminating connector;

the array of RFID readout antenna elements attached to equipment or patch panels, such that each short-range antenna element is located within 4 mm of a corresponding numbered connector receptacle and able to read out an RFID tag identifier of any of the multiplicity of cables connected to the corresponding numbered connector receptacle; and a remote management server for storing data of the RFID tag identifier associated with each of the multiplicity of cables, the identifiers associating each RFID antenna element with a particular numbered connector receptacle, wherein a volume of an RFID tag is less than 200 cubic millimeters, and wherein the RFID tags are energized passively by a close-coupled RF excitation signal and comprise an integrated circuit and an inductor and capacitor forming a resonant circuit.

21. An RFID (radio-frequency identification) tracking system for data center assets for automatically discovering and tracking a configuration of a multiplicity of cables terminated in connectors and connected to one of a multiplicity of numbered connector receptacles, the system comprising:

one or more equipment racks, including networked devices therein with multiple spaced apart connector receptacles therein, each equipment rack having an RFID tracking module operating at a given frequency with an upstream network management interface and a downstream array of short-range RFID readout antenna elements, each antenna element being individually addressable by a multiplexing circuit;

a multiplicity of fiber optic cables, each having a pair of terminating connectors, each cable including an RFID tag with a corresponding tag identifier and with less than 5 mm readout range attached in the vicinity of each said terminating connector;

the array of RFID readout antenna elements attached to equipment or patch panels, such that each short-range antenna element is located in the vicinity of a corresponding numbered connector receptacle and able to read out an RFID tag identifier of any of the multiplicity of cables connected to the corresponding numbered connector receptacle; and a remote management server for storing data of the RFID tag identifier associated with each of the multiplicity of cables, the identifiers associating each RFID antenna element with a particular numbered connector receptacle, wherein peak voltage at the given frequency on the short-range antenna element is greater than 10 volts.

22. A system as in claim 21, wherein the RFID tags are energized passively by a close-coupled RF excitation signal and comprise an integrated circuit and an inductor and capacitor forming a resonant circuit.

* * * * *